(12) United States Patent
Yashchin et al.

(10) Patent No.: US 12,293,373 B2
(45) Date of Patent: May 6, 2025

(54) ASSOCIATING DISTURBANCE EVENTS TO ACCIDENTS OR TICKETS

(71) Applicant: International Business Machines Corporation, Armonk, NY (US)

(72) Inventors: Emmanuel Yashchin, Yorktown Heights, NY (US); Nianjun Zhou, Chappaqua, NY (US); Anuradha Bhamidipaty, Yorktown Heights, NY (US); Dhavalkumar C. Patel, White Plains, NY (US); Arun Kwangil Iyengar, Yorktown Heights, NY (US); Shrey Shrivastava, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 17/400,276

(22) Filed: Aug. 12, 2021

(65) Prior Publication Data

US 2023/0048378 A1    Feb. 16, 2023

(51) Int. Cl.
*G06Q 30/00* (2023.01)
*G06F 18/214* (2023.01)
(Continued)

(52) U.S. Cl.
CPC ....... *G06Q 30/016* (2013.01); *G06F 18/2155* (2023.01); *G06N 20/00* (2019.01); *G06Q 10/02* (2013.01)

(58) Field of Classification Search
None
See application file for complete search history.

(56) References Cited

U.S. PATENT DOCUMENTS

| | | |
|---|---|---|
| 8,280,633 B1 | 10/2012 | Eldering et al. |
| 9,443,194 B2 | 9/2016 | Chu et al. |

(Continued)

FOREIGN PATENT DOCUMENTS

| | | |
|---|---|---|
| AU | 2019203569 A1 | 6/2019 |
| FR | 2872916 B1 | 11/2006 |

(Continued)

OTHER PUBLICATIONS

Jin, Baihong et al., A One-Class Support Vector Machine Calibration Method for Time Series Change Point Detection, Feb. 18, 2019 IEEE—2019 IEEE International Conference on Prognostics and Health Management (ICPHM) (Year: 2019).*

(Continued)

*Primary Examiner* — Michael W Schmucker
(74) *Attorney, Agent, or Firm* — Scully, Scott, Murphy & Presser, P.C.; James Olsen

(57) ABSTRACT

Methods and systems to provide a form of probabilistic labeling to associate an outage with a disturbance, which could itself be either known based on the available data or unknown. In the latter case, labeling is especially challenging, as it necessitates the discovery of the disturbance. One approach incorporates a statistical change-point analysis to time-series events that correspond to service tickets in the relevant geographic sub-regions. The method is calibrated to separate the regular periods from the environmental disturbance periods, under the assumption that disturbances significantly increase the rate of loss-causing events. To obtain the probability that a given loss-causing event is related to an environmental disturbance, the method leverages the difference between the rate of events expected in the absence of any disturbances (baseline) and the rate of actually observed events. In the analysis, the local disturbances are (Continued)

identified and estimators of their duration and magnitude are provided.

12 Claims, 16 Drawing Sheets

(51) Int. Cl.
    *G06N 20/00*      (2019.01)
    *G06Q 10/02*      (2012.01)
    *G06Q 30/016*      (2023.01)

(56) References Cited

U.S. PATENT DOCUMENTS

| | | | |
|---|---|---|---|
| 10,599,747 B1* | 3/2020 | Hoff | G06Q 50/06 |
| 2005/0027571 A1 | 2/2005 | Gamarnik et al. | |
| 2011/0029711 A1* | 2/2011 | Dhuse | G06F 11/1076 |
| | | | 711/170 |
| 2016/0018458 A1* | 1/2016 | Basu | G01R 31/088 |
| | | | 702/59 |
| 2020/0127882 A1 | 4/2020 | Upadhya et al. | |
| 2020/0142097 A1 | 5/2020 | Natsumeda et al. | |
| 2021/0049060 A1 | 2/2021 | Heilmann et al. | |

FOREIGN PATENT DOCUMENTS

| | | |
|---|---|---|
| WO | 2007019524 A2 | 2/2007 |
| WO | 2019080706 A1 | 5/2019 |

OTHER PUBLICATIONS

Truong et al, "Selective Review of Offline Change Point Detection Methods." https://arxiv.org/pdf/1801.00718.pdf. Mar. 26, 2020. 58 pages.

Kulldorff, "Spatial Scan Statistics: Models, Calculations, and Applications." https://www.researchgate.net/publication/224001983_Spatial_Scan_Statistics_Models_Calculations_and_Applications. Mar. 28, 2015. 22 pages.

* cited by examiner

| INCID_ID | OUTAGE_START_TIME | SUBSTATION | STORM_ID | CAUSE_DESC | CUST_AFFECTED |
|---|---|---|---|---|---|
| 3584 | 1/9/2013 20:21 | PX1 | | EQUIPMENT\ | 100 |
| 3643 | 1/9/2013 20:33 | OX1 | | TREE\FALLEN | 34 |
| 3824 | 1/9/2013 20:48 | OX2 | | TREE\FELL ON | 1 |
| 3943 | 1/9/2013 20:58 | FX1 | | TREE\FALLEN | 65 |
| 3943 | 1/9/2013 20:58 | FX1 | | TREE\FALLEN | 270 |
| 4324 | 1/9/2013 21:40 | WX1 | | TREE\FALLEN | 32 |
| 4363 | 1/9/2013 21:55 | FX1 | | EQUIPMENT\ | 1 |
| 4443 | 1/9/2013 22:16 | HX1 | | TREE\FALLEN | 0 |
| 4463 | 1/9/2013 22:16 | PX2 | | TREE\FALLEN | 28 |
| 4503 | 1/9/2013 22:26 | BX1 | | TREE\FELL ON | 1 |
| 4684 | 1/9/2013 23:34 | WX1 | | TREE\BRANCH | 30 |
| 5383 | 1/10/2013 9:03 | MX1 | | TREE\FALLEN | 114 |
| 5503 | 1/10/2013 9:19 | BX2 | | TREE\FELL ON | 1 |
| 5523 | 1/10/2013 9:20 | MX1 | | TREE\FALLEN | 6 |
| 5783 | 1/10/2013 10:29 | PX3 | | TREE\FALLEN | 1 |
| 6543 | 1/10/2013 14:48 | TX1 | | EQUIPMENT\ | 1 |

FIG. 2A

| INCID_ID | OUTAGE_START_TIME | SUBSTATION | STORM_ID | CAUSE_DESC | CUST_AFFECTED | FOUND_STORM_WITH_SUBSTATION | STATUS | P_LABEL | KNOWN_STORM_IDS |
|---|---|---|---|---|---|---|---|---|---|
| 3584 | 1/9/2013 20:21 | PX1 | | EQUIPMENT | 100 | | N | 0 | |
| 3643 | 1/9/2013 20:33 | OX1 | | TREEFALLEN | 34 | | N | 0 | |
| 3824 | 1/9/2013 20:48 | OX2 | | TREEFELL ON | 1 | | N | 0 | |
| 3943 | 1/9/2013 20:58 | FX1 | | TREEFALLEN | 65 | fx1_2013-01-08_2013-01-09 | E | 0.95 | [ ] |
| 3943 | 1/9/2013 20:58 | FX1 | | TREEFALLEN | 270 | fx1_2013-01-08_2013-01-09 | E | 0.95 | [ ] |
| 4324 | 1/9/2013 21:40 | WX1 | | TREEFALLEN | 32 | | N | 0 | |
| 4363 | 1/9/2013 21:55 | FX1 | 72 | EQUIPMENT | 1 | fx1_2013-01-08_2013-01-09 | E | 0.95 | [ ] |
| 4443 | 1/9/2013 22:16 | HX1 | | TREEFALLEN | 0 | | N | 0 | |
| 4463 | 1/9/2013 22:16 | PX2 | | TREEFALLEN | 28 | | N | 0 | |
| 4503 | 1/9/2013 22:26 | BX1 | | TREEFELL ON | 1 | | N | 0 | |
| 4684 | 1/9/2013 23:34 | WX1 | | TREEBRANCH | 30 | | N | 0 | |
| 5383 | 1/10/2013 9:03 | MX1 | | TREEFALLEN | 114 | mx1_2013-01-10_2013-01-20 | S | 0.9 | [12700] |
| 5503 | 1/10/2013 9:19 | BX2 | | TREEFELL ON | 1 | | N | 0 | |
| 5523 | 1/10/2013 9:20 | MX1 | | TREEFALLEN | 6 | mx1_2013-01-10_2013-01-20 | S | 0.9 | [12700] |
| 5783 | 1/10/2013 10:29 | PX3 | | TREEFALLEN | 1 | | N | 0 | |
| 6543 | 1/10/2013 14:48 | TX1 | | EQUIPMENT | 1 | | N | 0 | |

FIG. 2B

| CAUSES | PERCENTAGE AND ORDER IN PRE-ASSIGNED TICKETS | PERCENTAGE AND ORDER IN ALL TICKETS |
|---|---|---|
| TREE/FALLEN ON MAIN LINE | 27.9% (28571, ORDER 1) | 11% (65152, 2) |
| TREE/FELL ON SECONDARY LINE | 13.4% (13734, 2) | 5.3% (31420, 5) |
| EQUIPMENT/STORM MATERIAL FAILURE | 7.9% (8072, ORDER 3) | 2.5% (14866, 14) |
| EQUIPMENT/STORM UNKNOWN | 7.0% (7155 ORDER 4) | 2.9% (17102, 12) |
| TREE/BRANCH FALLEN ON LINE | 4.7% (4805, ORDER 8) | 2.47% (14673, 15) |

FIG. 5

| PARAMETER NAME | NOTATION | DEFAULT VALUE |
|---|---|---|
| NUMBER OF DAYS IN A MONTH | $D$ | 28 |
| ROBUSTNESS (TRIMMING) CUTOFF | $r$ | 10 |
| BIAS CORRECTION | $B$ | 0.15 |
| MINIMUM TICKET RATE THRESHOLD | $\beta_j$ | 0.2 |
| *CUSUM* REFERENCE VALUE | $k$ | 1 |
| STORM DETECTION THRESHOLD | $h$ | 6 |
| STORM-RELATED PROBABILITY THRESHOLD | $p_0$ | .5 |
| EXTENDED STORM WINDOW BUFFERS | $(\varepsilon_1, \varepsilon_2)$ | (1,1) |

FIG. 8A

```
S_PREVIOUS = S_0
FOR INDEX, ROW IN DF_SELECTED_MONTH_TICKETS.ITERROWS():
    NORM_STORM_LIKE_TICKETS = ROW['NORM_STORM_REVEALING_TICKETS']
    S = MAX(S_PREVIOUS + NORM_STORM_REVEALING_TICKETS - K, 0)          ~610
    DF_SELECTED_MONTH_TICKETS.AT[INDEX,'CUSUM_PAGE'] = S
    IF (S > H):  ~620
        S_PREVIOUS = S_0  ~622
        DF_SELECTED_MONTH_TICKETS.AT[INDEX,'CUSUM_PAGE'] = S
        DF_SELECTED_MONTH_TICKETS.AT[INDEX,'INDEX_CUSTUM'] = 1.0
    ELSE:
        S_PREVIOUS = S  ~625
```

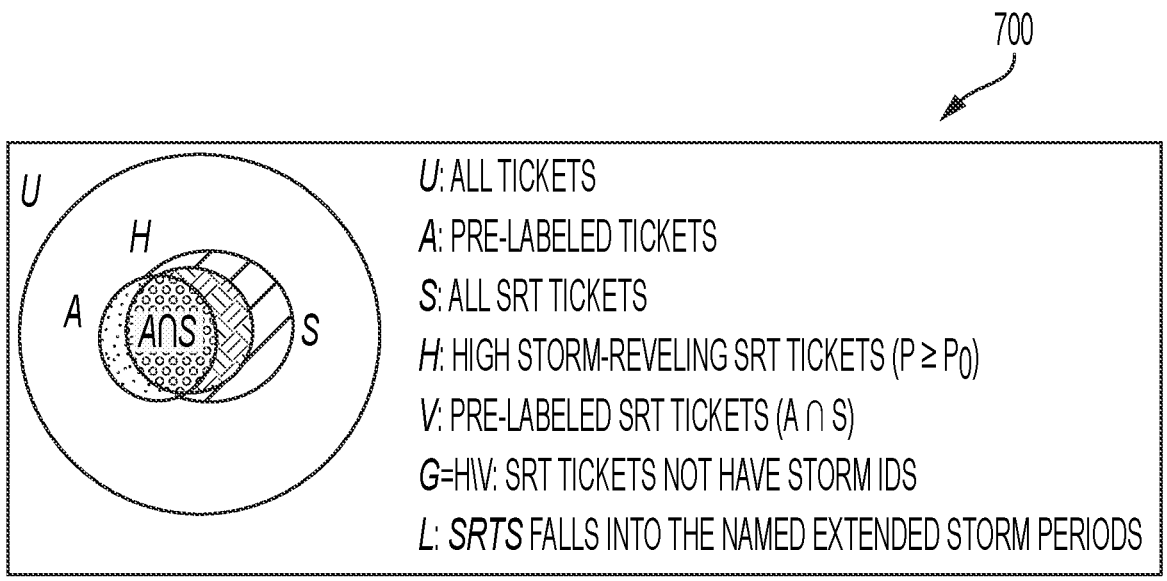

U: ALL TICKETS
A: PRE-LABELED TICKETS
S: ALL SRT TICKETS
H: HIGH STORM-REVELING SRT TICKETS (P ≥ P_0)
V: PRE-LABELED SRT TICKETS (A ∩ S)
G=HV: SRT TICKETS NOT HAVE STORM IDS
L: SRTS FALLS INTO THE NAMED EXTENDED STORM PERIODS

ASSOCIATING DISTURBANCE EVENTS TO ACCIDENTS OR TICKETS

The present application relates generally to computers and computer applications, and more particularly to systems and methods for generating data useful to train machine learning models to perform predictions and forecasting.

Environmental disturbances, such as weather storms, blizzards, and electromagnetic disasters, often cause failure or malfunction of assets and related outage events leading to service quality issues. However, such failure events could also happen in a time when there are no environmental disasters. That is, it is common that the failures cannot be identified as being caused by a disturbance based on the data due to the limited information available at the time of data compilation, time constraints, or personnel's insufficient training. It is always desirable for better business management to have all the failure events being properly labeled or categorized, e.g., with catastrophe.

Such disturbance examples can be found often for Infrastructure companies, the power Infrastructure for electrical companies distributing electricity (weather storm), sensor networks deployed in wild for chemical manufacturing processes (electromagnetic disaster).

Any serious analysis today requires clean data for those malfunction or failure events. Therefore, there is a need to have automatic labeling for the events to separate normal or environmental disturbances cases.

From data quality perspective, there is a need to validate existing labels and fill the missing labels.

SUMMARY

A system, method and computer program product provides the ability to automatically label an asset malfunction, failure, or outage event reliably as one caused by a disturbance (e.g., environmental disturbance).

As machine learning (ML) models can be trained and run by a hardware processor to perform predictions and generate forecasts relating to an input, the system, method and computer program product is provided that processes data to properly label and/or categorize the data (e.g., with catastrophe) prior to being used as training data of the model training set such that training data quality is improved.

The system, method and computer program product automatically labels and/or categorizes (with catastrophe) trouble tickets associated with infrastructure failure events with environmental disturbances in regions that typically cause certain assets to malfunction or fail, and/or engender outages.

The system, method and computer program product provides a probabilistic labeling to associate an asset malfunction, failure or outage with a disturbance, which could itself be either known based on the available data or unknown.

The system, method and computer program product implements a statistical change-point analysis to time-series events that correspond to service tickets in relevant geographic sub-regions.

The system and method framework automatically labels events to separate normal or environmental disturbances cases prior to being used as training data of a model training set.

The system and method framework provides automated data processing to "clean" data for those malfunction or failure events for a variety of use case domains prior to being used as training data of a model training set.

The system and method framework further validates existing labels and fill the missing labels of a model training set and being automated, greatly reduces the time needed to be invested by the human validators. Ultimately, the system and methods identifies all storms and labels tickets as storm-related or not.

In some examples, a system for probabilistic labeling is provided. The system comprises: a memory; a processor comprising hardware, the processor is configured to be in communication with the memory. The processor is configured to: receive a set of service records from a data source, one or more service records corresponding to a plurality of disturbance-revealing events of a specified region occurring during a time period, one or more service records being mislabeled or having no label relating to an associated disturbance; determine an observed actual event rate for disturbance-revealing events of the time period; determine a baseline mean periodically-aggregated rate of expected service related records under non-disturbance conditions of the time period; determine a set of standardized daily scores as a function of the baseline mean periodically-aggregated rate and observed actual event rate during the time period; identify a disturbance time window based on changes of standardized periodically-aggregated scores detected during the time period; generate a disturbance-related probability for the service records corresponding to the identified disturbance time window; and re-assign a label, based on the generated probability, to a service ticket as being related to the identified disturbance time window.

In some examples, a method for probabilistic labeling is provided. The computer-implemented method comprises: receiving, by a hardware processor, a set of service records from a data source, one or more service records corresponding to a plurality of disturbance-revealing events of a specified region occurring during a time period, one or more service records being mislabeled or having no label relating to an associated disturbance; determining, by said hardware processor, an observed actual event rate for disturbance-revealing events of the time period; determining, by said hardware processor, a baseline mean periodically-aggregated rate of expected service related records under non-disturbance conditions of the time period; determining, by said hardware processor, a set of standardized periodically-aggregated scores as a function of the baseline mean periodically-aggregated rate and observed actual event rate during the time period; identifying, by said hardware processor, a disturbance time window based on changes of standardized periodically-aggregated scores detected during the time period; generating, by said hardware processor, a disturbance-related probability for the service tickets corresponding to the identified disturbance time window; and re-assigning a label, based on the generated probability, to a service record as being related to the identified disturbance time window.

In some examples, a computer program product for probabilistic labeling is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2A shows a service ticket dataset used in the data quality analysis prior to a remediation;

FIG. 2B depicts a modified dataset output after remediation including records having the information of the detected storms and including the probabilistic labels;

FIG. 5 depicts a table showing characteristics of Storm-Revealing Tickets in an example embodiment;

FIG. 8A depicts a table summarizing the notation and exemplary default values used in the change-point analyses according to an embodiment herein;

FIG. 11 illustrates an example pseudocode of the calibrated change-point method in which time points are obtained as illustrated in FIG. 10A to establish storm boundaries;

FIG. 12 depicts a diagram of the data subsets used in a validation process and particularly depicts a utility company's ticket categorization according to an embodiment herein;

DETAILED DESCRIPTION

Figure 1:
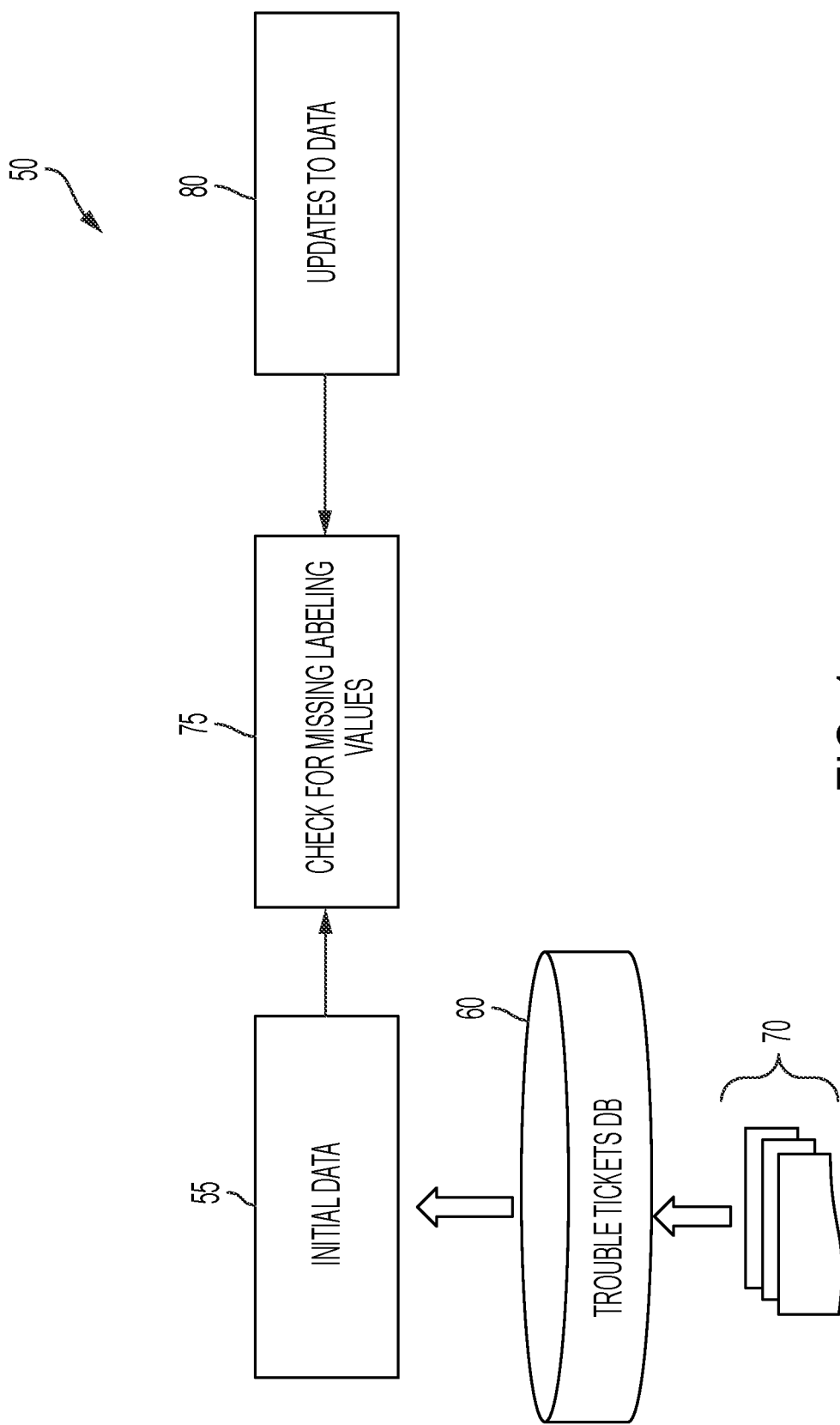
FIG. 1 shows a general overview of the system framework for probabilistic labelling of events, disturbance detection and identification.

In an embodiment, a system framework implements methods for probabilistic labelling of records or data relating to events (e.g., asset malfunctions, equipment failures and outages), disturbance detection and identification.

The ability to label an asset malfunction, failure and outage event reliably as one caused by a disturbance substantially improves data quality and open ways to additional analytic techniques, which ultimately leads to better outage detection, prediction, and management.

By way of example, the system framework is described in an example context of weather related disturbance management, e.g., implemented by a utility company. Of special interest are disturbances related to storms, and companies of this type tend to emphasize preparedness, minimizing the number of customers affected, and resource planning. It is thus vital for them to understand the relationship between the disturbances (weather conditions) and their outages.

To aid in the explanation, several definitions of terms is provided in the context of managing weather-related outages.

A "service" is the act of performing work for customers in accordance with some contractual obligations. Examples include providing electrical power or computing support. In an example, a focus is on the interests of service-providing companies, such as power utilities.

A "disturbance" is an interruption of a settled or normal condition of services. Disturbances can be fully or partially predictable. Their effect is to alter or stress the infrastructure supporting the services to the extent that causes service quality issues, such as interruptions. In the weather-related outage analysis, a disturbance corresponds to storms. In this context, the impact of a disturbance is often related to the power line infrastructure of the local sub-region and its properties (e.g., demography or topography). Another example of a disturbance in another domain or context is a disturbance such as a change in a computer operating system, e.g., in the case of a help desk service domain.

An "event" is a maintenance or repair request to provide corrective action to ensure a service's quality. Events may (or may not) be related to disturbances. In the storm analysis, events often correspond to power restoration requests in the form of outage repair tickets.

A "Disturbance-Revealing Event (DRE)" is a specific family of events that tend to occur more often in the presence of disturbance than in its absence. Such events could be identified through prior subject matter knowledge or via statistical analysis. In the case of storm outage analysis, one type of DRE corresponds to a power failure caused by a fallen tree; another type would be a power outage caused by the necessity to remove a tree leaning towards a power line. In the context of weather-related outages, DREs are associated with service tickets that are referred to herein as storm-revealing tickets (SRTs).

"Prior-known Disturbances" are a set of disturbances known before the event assignment to them. In weather-related applications, these are the "known storms", aka. "named storms".

"Prior-labeled Events" are events have been assigned to respective disturbances. In a weather-related example, they represent the service tickets that are assigned to a storm by the time they are closed.

A "Disturbance-Related probability" is the probability of a DRE event to be associated with a disturbance. In the case of weather outages, this is a probability that a given SRT is associated with a storm.

"Labeling" is a process of assigning a DRE (or SRT) to a disturbance. Such assignments could be deterministic (i.e., TRUE/FALSE) or probabilistic. In weather-related applications, the system framework provides probabilistic labels that assign the SRTs to either known or newly discovered storms.

A "Validation" is the process of establishing consistency of probabilistic labels based on the set of the prior-labeled events and the time periods corresponding to known and newly discovered storms. Event and disturbances are often location-specific. For example, in the given storm outage analysis, the tickets are sub-divided into sub-regions due to the process of ticket initiation and the storm's spatial coverage. In this case, local disturbances are defined as the disturbances identified for a specific geographic location.

The weather-related outages are the primary cause of concern for power utility companies. FIG. 1 shows a general overview of the system framework 50 for probabilistic labelling of events, disturbance detection and identification. A first processing step implemented by a computer system is the accessing of initial data 55, e.g., obtained from a trouble ticket database 60 including a set of data related to the stream of service tickets 70 of a specific region including data relating to service outages such as caused by weather-related disturbances. These tickets may include information associating a specific outage with an identified storm. Thus at least two sets of data are required: Tickets or logs and weather (or environmental data). The tickets can contain the information related to the disturbance family and a part of the tickets has known the storm ID (used for validation), usually none of them are labelled as non-storm related. Additional data included may include weather data such as including, but not limited to: hourly pressure, wind speed, gust, precipitation etc.

A further processing step 75 implemented by the computer system is an assessment of the quality of the SRT data, for example, a check of 1) the percentage of the missing labels, 2) a check for the tickets that are labeled unreliably, e.g., have a temporal or spatial (geographic) discrepancy. Such quality determination may be performed by a validator that analyzes the data and generates a quality report including a description, a pass/fail assessment, a score and/or a recommendation with any details and/or visualizations. A remediator can analyze the quality report and repair the data report and generate a remediation report. Alternatively, an iterative process may be employed that receives input service ticket data and employs a workflow pipeline that implements a knowledge graph to learn and configure constraints, generates a data profile, applies the constraints and presents results in the generated quality report that is used by a remediator to repair the data in a remediation process.

Thus, in FIG. 1, at 75, if the SRT data quality is deemed not acceptable, e.g., does not meet a quality threshold, then a remediation step is performed in the manner according to embodiments described herein. The remediation step is performed at 80 to update and bring the dataset in order, i.e., identify missing storms, and to perform assigning of the proper individual disturbance from each disturbance-revealing event and provide a probability to quantify the confidence of such assignment. Such a remediation step efficiently imputes the missing labels (probabilistic labels) and identifies the proper storms/storm periods. The probabilistic labels are produced and all missing storms are identified such that the data set becomes updated and of increased suitability for training a machine learned model.

FIG. 2A shows a service ticket dataset 60 used in the data quality analysis prior to a remediation. In FIG. 2A, dataset 60 consists of electric utility service records (tickets) 70 corresponding to the handling of real and anticipated outages. Each record 70 is self-contained and indicates multiple attributes. There is no limit to the amount of records in a dataset 60 and the dataset can contain hundreds of thousands of records covering multiple substations and spanning a period of years. As shown, each record 70 includes attributes used for the analysis including: a Ticket ID field 63; an estimated start time of the outage 65 that is filled with a timestamp at the time of ticket initiation; and an effective substation field 68 indicating an affected coverage area. Additionally included is: a Storm ID field 73 which field is filled only if the outage is caused by a storm; a cause description field 75 indicating a cause of a specific outage; and a field 78 indicating the number of customers affected. There may be an additional field (not shown) corresponding to an end time including a timestamp that is filled at the ticket closing. While the tickets may have an assigned storm ID— however, as shown in dataset 60, before remediation, there are many storm-related ticket records, e.g., tickets 72, for which this associated Storm ID field is missing or empty. Furthermore, there exist tickets for which this field is erroneous. Thus, as shown in the dataset 60 of FIG. 2A, imputation and remediation actions are necessary in relation to these fields/records.

Figure 3:
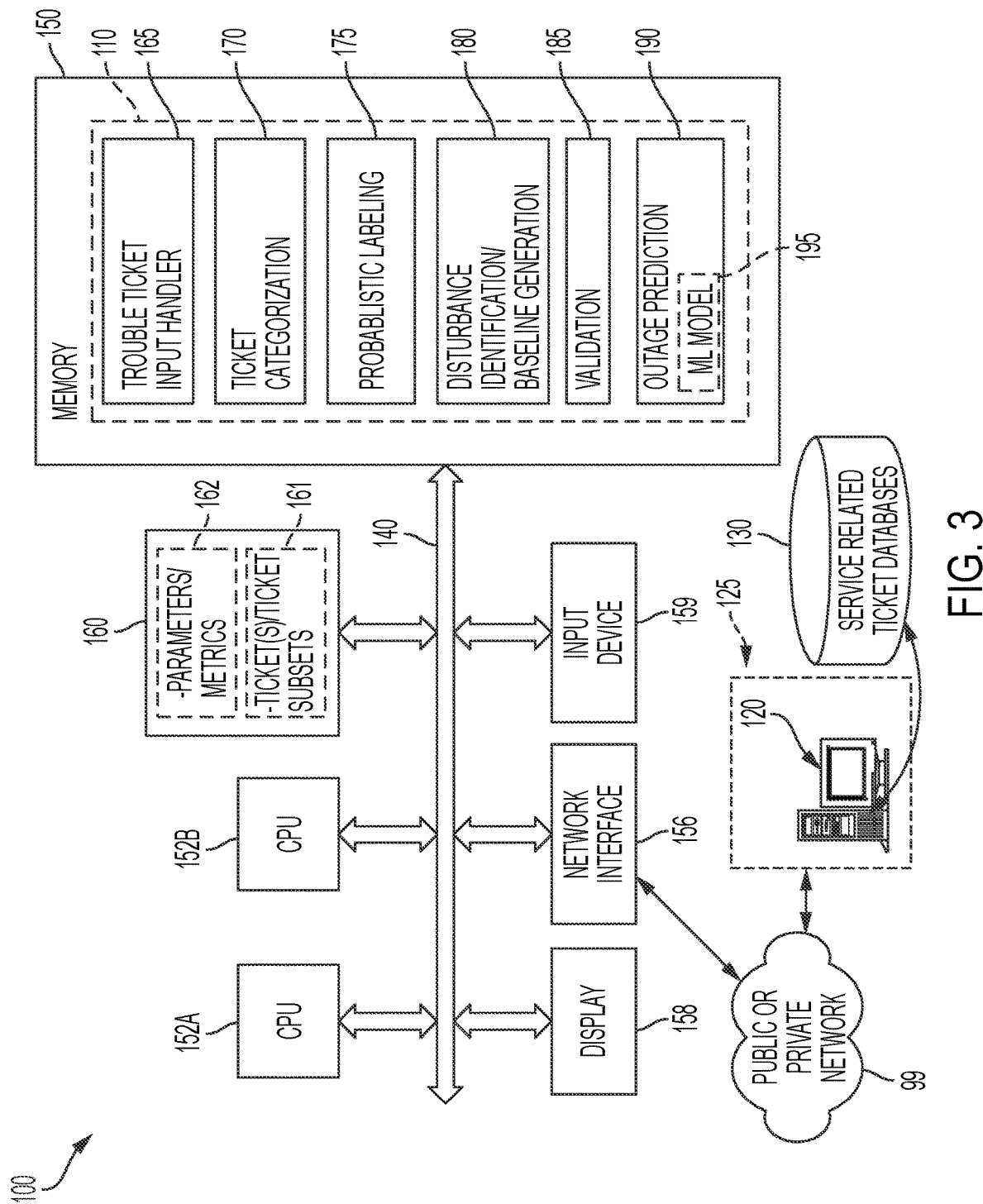
FIG. 3 depicts a computer system for the implementation of the framework and methodology for improving the performance of a trouble ticket dataset according to embodiments herein.

FIG. 3 depicts a computer system 100 for the implementation of the framework and methodology for improving the performance of a trouble ticket dataset used for machine model training, and particularly for associating service tickets to disturbance events according to embodiments herein. In some aspects, system 100 may include a computing device, a mobile device, or a server. In some aspects, computing device 100 may include, for example, personal computers, laptops, tablets, smart devices, smart phones, or any other similar computing device.

Computing system 100 includes one or more hardware processors 152A, 152B, a memory 150, e.g., for storing an operating system and application program instructions, a network interface 156, a display device 158, an input device 159, and any other features common to a computing device. In some aspects, computing system 100 may, for example, be any computing device that is configured to communicate with one or more web-sites 125 including a web- or cloud-based server 120 over a public or private communications network 99. For instance, while exemplary embodiments described herein are in the context of a utility company servicing and management of trouble tickets that focuses on weather-related disturbances, web-site 125 may include a database resource 130 that provides electric utility service records (tickets).

As the framework herein is applicable to many contexts, database 130 may include trouble ticket data held by other enterprises in the context of disturbance management in other domains. Examples of such domains include technology (in the analysis of computer network overloads and other phenomena arising in QoS assurance), insurance (where disturbances are typically associated with an unusually high volume of claims), or finance, where events correspond to transactions.

Further, as shown as part of system 100, there is provided a local memory 160 useful for storing and processing tickets and ticket subsets 161 and/or store selected and/or default parameters and other metrics 162 used in the data processing framework such as for evaluating data quality. Such a device may include an attached memory storage device 160, or a remote memory storage device, e.g., a database, accessible via a remote network connection for input to the system 100.

In the embodiment depicted in FIG. 3, processors 152A, 152B may include, for example, a microcontroller, Field Programmable Gate Array (FPGA), or any other processor that is configured to perform various operations. Additionally shown are the communication channels 140, e.g., wired connections such as data bus lines, address bus lines, Input/Output (I/O) data lines, etc., for routing signals between the various components of system 100. Processors 152A, 152B are configured to execute method instructions as described below. These instructions may be stored, for example, as programmed modules in a further associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

As mentioned, memory 150 of computer system 100 further stores processing modules that include programmed instructions adapted to invoke operations for more accurately labeling asset malfunctions, e.g., outage events, reliably as one caused by a disturbance, e.g., a storm, and substantially improving data quality such that the data can be used to train machine learned models and enable additional analytic techniques that leads to better outage detection, prediction, and management.

In one embodiment, one of the programmed processing modules stored at the associated memory 150 include a module 165 that is provided with computer readable instructions, data structures, program components and application interfaces for ingesting: inputting, collecting and/or handling of trouble tickets 70 received from trouble ticket database 130 or like data source.

A further programmed processing module includes a disturbance ticket categorization module 170 provided with computer readable instructions, data structures, program components and application interfaces for preparing the ticket categorization, which helps to (a) ensure the correctness of SRTs and b) identify the falsely labeled tickets.

A further programmed processing module includes a probabilistic labeling module 175 provided with computer readable instructions, data structures, program components and application interfaces for interacting with the SRTs and automating the probabilistic labeling process of the trouble ticket events as described herein. This module runs method for establishing the family of the storm reveling tickets (or, more generally, disturbance-revealing events) to serve as a base for weather storm (or disturbance) detection and diagnostics. A further probabilistic labeling method is run for assigning the probability for an event to be associated with a type of disturbance. The approach involves a combination of statistical methodology, data analysis, and domain knowledge expertise. In an embodiment, baseline process characteristics using robust estimation methods and imputation are obtained for a complete time range; Disturbance periods are then identified, and their characteristics contrasted against baseline. Probabilistic labeling is then obtained using a form of contrasts.

A further programmed processing module includes a disturbance identification module 180 provided with computer readable instructions, data structures, program components and application interfaces for identifying the time periods of the disturbances and particularly runs one or more size-calibrated change point detection methods to identify disturbance cycles. The processing provides for the separate modeling of the non-disturbance (baseline) behavior including the development of a baseline using bound and bias-corrected trimmed estimation as described herein and the modeling of the ticket stream under disturbance (storm) conditions. This technique can be used for efficient and automated generation of Probabilistic Labels (PL) under the conditions when disturbances do not dominate data set.

A further programmed processing module includes validation module 185 provided with computer readable instructions, data structures, program components and application interfaces providing a workable procedure that (a) re-discovers and handles labeling for the "known storms" and (b) discovers a dominant fraction of missed storms and labels the corresponding tickets. The validation of (b) at this stage can be aided with the help of human experts and can involve the tuning of parameters to achieve metrics that a customer finds satisfactory.

In one embodiment, another programmed processing module 190 stored at the associated memory 150 of system framework 100 employs instructions to configure the system to build and run a supervised machine learned model trained to correlate weather disturbances with particular outages and/or weather conditions based on the labeled data. For example, the framework achieves labeling of the SRTs to prior existed storms to address a data quality issue. However, in many cases, one primary objective for a utility company is to achieve the best predictive capability for outages related to an upcoming storm. Based on the data from previous storm events and the expected storm duration, the framework obtains a distribution for the number of tickets of various causes (for any given storm and sub-region). The quality of the prediction depends on the policy of assigning probabilities to tickets observed previously. Combined with the weather monitoring, the machine learned model is trained to also predict the number of affected customers, the costs, or resources required to mitigate the storm's effects within a timeframe of interest. For example, the trained model is then used to answer questions such as: What are contribution of infrastructure factors (number of poles, transformers, miles of lines) to the cost of outages? What are contribution of Geographic features? What is the effect of weather-related variables (precipitation, wind speeds, wind gusts).

This outage prediction model 195 can include a deep learning neural network (DNN) model such as a convolution neural network (CNN), a graph CNN, a multi-layer perceptron (MLP) or a recurrent neural network (RNN). The deep learning models can be written in Python using a TensorFlow library.

Such a machine learned model can be trained with the resulting data set including the more accurate relabeled data, according to the methods herein, and the trained model can be used to forecast a weather related service outage for an input set of weather conditions. Alternatively, or in addition, a machine learned model trained using such relabeled data sets can be run to facilitate longer-term planning and resource allocation to make the infrastructure more storm-resistant. For example, for every approaching storm, the framework could suggest preventive measures to mitigate storm outcomes: for example, if it is established that pole fires are more likely to occur during storm periods, actions to remove potentially threatening debris from connectors prior to the storm could help in that respect; if leaning trees are the cause of an excessive number of within-storm tickets, the utility company can take/preemptive measures to address this threat too.

As further shown in FIG. 3, memory 150 includes a supervisory program 110 having instructions for configuring the computing system 100 to invoke the various modules and run methods described herein for "cleaning" the trouble ticket data, i.e., to achieve probabilistic labeling of all trouble ticket data with disturbances (e.g., storms).

Figure 4:
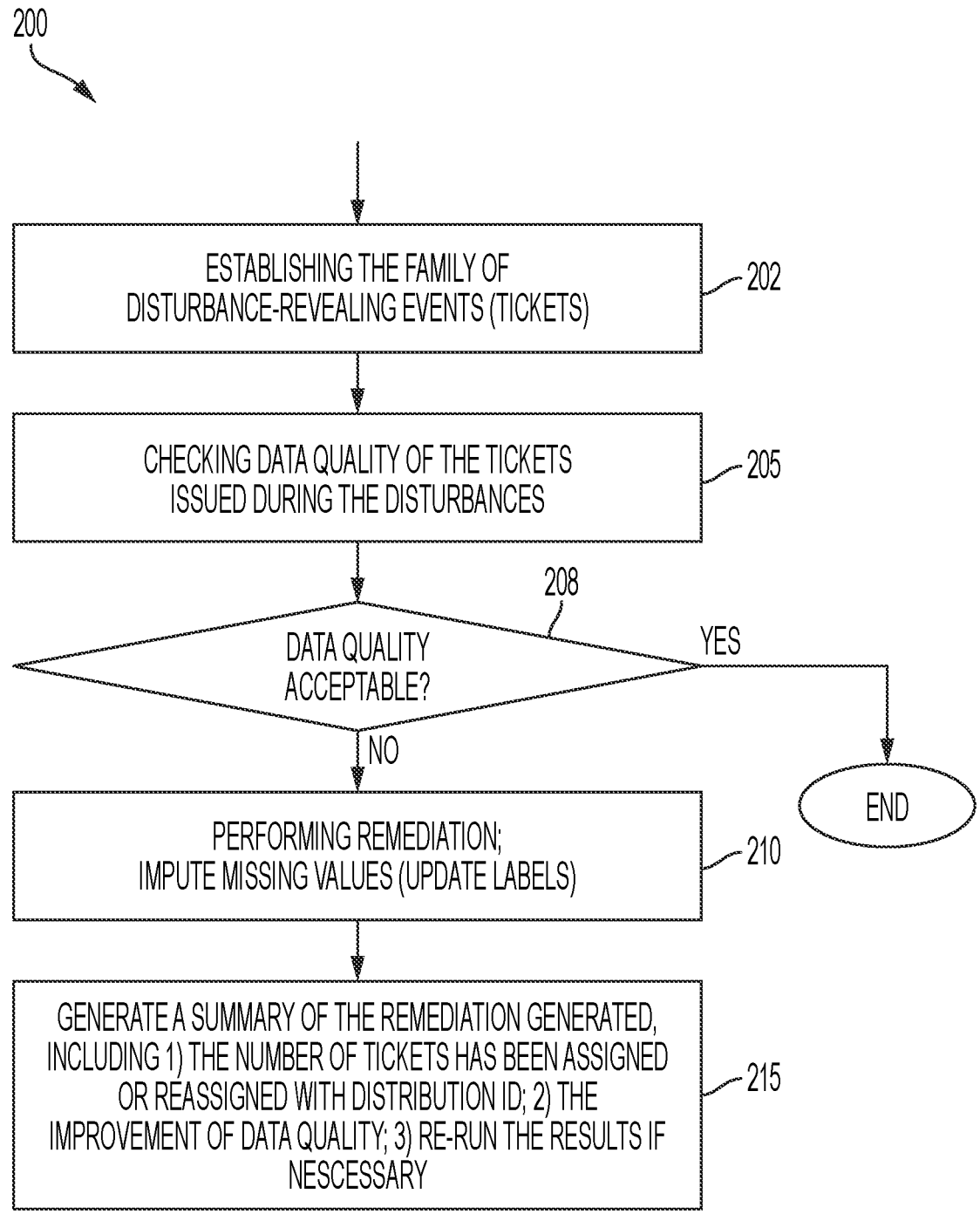
FIG. 4 is a method run by supervisory program implementing automated tasks for more accurately labeling (probabilistically) trouble ticket data with disturbances (e.g., storms) as run by system of FIG. 3.

FIG. 4 is a method 200 run by supervisory program 110 implementing automated tasks for more accurately labeling (probabilistically) trouble ticket data with disturbances (e.g., storms) as run by system 100. For example, Prob[ticket is storm related]=0.8.

In the method 200 of FIG. 4, a first step 202 involves the establishing of a family of disturbance-revealing events (tickets). That is, in an embodiment, the framework implements an approach that hinges on the existence of a family of tickets that have a particular property: they tend to occur more often in the presence of a disturbance than in their absence. In the exemplary embodiment herein, in the context of a utility company, the disturbance is a storm engendering issuance of trouble tickets related to outage events. Thus, there is identified at 202 a family of Storm-Revealing Tickets (SRTs). In an embodiment, a family is developed based on the subject matter knowledge alone. To create an SRT family, experts can be consulted and independent sources and the underlying scientific evidence can be analyzed. In an embodiment, the family is determined based on observed features—whether manually observed or from Internet-of-Things (IoT) sensors.

In an embodiment, the SRT family is selected based on domain knowledge and then the selection is confirmed using statistical analysis. FIG. 5 depicts a table 90 showing characteristics of Storm-Revealing Tickets in an example embodiment. In an embodiment, the SRT family 91 is first selected based on domain knowledge for example and then the selection can be confirmed using statistical analysis. As shown in Table 90, two columns 94, 96 indicate respective first and second sets of tickets being created: 1) a (percentage, order) of tickets with the storm ID pre-assigned; and 2) a (percentage, order) of all tickets. A first column 92 of table 90 shows the cause description of an exemplary ticket family: e.g., a tree has fallen on the main power line; a tree has fallen on the secondary power line; an equipment malfunction due to a storm caused material failure; an equipment malfunction due to storm; or a tree or branch has fallen on the power line. Based on the percentages shown in the table 90, there can be expected significant differences in distributions of the cause descriptions. To prevent signal dilution, the number of causes of (storm revealing) of a trouble ticket family is limited a priori, e.g., the six causes shown in table 90 of FIG. 5.

Returning to FIG. 4, a further step 205 involves the checking of the data quality of the tickets issued during the disturbances. The check analyzes the labeling coverage for the tickets belonging to the family of disturbance-revealing events and the coverage is the indicator for data quality.

Several significant data quality challenges can arise in the ticket dataset described above. Some of these challenges are, in principle, unavoidable and thus represent a "missing data" issue rather than a quality issue per se. The key data issues are: 1) Missing fields: In the database, a significant percentage of SRT lacks the storm ID assignment, even though they fall into the known storm time windows. Using the techniques described herein, it is statistically proven that the missing label problem is present and the problem remedied via imputation. The likely reasons for this issue are the inability to establish the causal connection to the storm at the time of the ticket completion or insufficient information about the storm itself; 2) Wrong labeling: It is possible for non-SRT to be assigned to a known storm (and actually be caused by the storm)—however, there may be instances of the assignment being applied very broadly, and sometimes for no other reason than the ticket falling into a known storm time window. Here too, the presence of mislabeling can be statistically proven using the framework approach and remedies herein; and 3) Missing Storms—Based on an analysis, the list of "known storm" disturbances is incomplete: there exist storms of various magnitudes that are not recorded in the ticket database. These storms cause identifiable clusters of SRT, often covering several sub-regions. For the machine-learning and any other inferential activity, the system 100 identifies such storms and assigns the relevant tickets to them, to create an overall consistent picture of storm-related impact in the database.

In an embodiment, at 205, FIG. 4, the data quality check is applied to determine: 1) the percentage of the missing labeling, and 2) check the missing labeling having temporal or spatial (geographic) discrepancy. In an embodiment, the data quality check may entail the creating of a metric to define the coverage of the labeled events (tickets) falling into the set of known disturbance periods; and a quantifying of the metric value. In an embodiment, the metric is a ratio between the labeled SRT tickets falling into the set of known disturbance periods and all SRT tickets falling into the set of known disturbance periods. Continuing at 208, FIG. 4, a determination is made to determine whether the data quality is acceptable, e.g., by determining whether a poor-quality signal results if the coverage is lower than a threshold. If the data quality is deemed acceptable the process ends and/or can return to process newly received trouble tickets. Acceptable data quality ensures greater accuracy of developed outage forecast models trained on such data.

Otherwise, returning to 208, if the data quality is deemed not acceptable, the process proceeds to 210 where the system performs a remediation according to embodiments described herein, and imputes the missing data values. Afterwards, at 215, the method generates a summary of the remediation, including: 1) the number of tickets has been assigned or reassigned with distribution ID; 2) the improvement of data quality. There is further determined whether the results of the remediation and imputation of missing values needs to be re-evaluated and re-run the data quality check and determine whether there is a need for further remediation. If there is a need for further remediation, the steps of FIG. 4 can be re-run.

In a basic remediation approach, the SRT assignment is achieved in two phases. A first phase focuses on the time series of SRT tickets for individual sub-regions, which are typically identified via the names of the corresponding service sub-stations. Using the time series, there is calculated the storm-related probability for the SRTs, for every date. This accomplishes the task of probabilistic labeling. By applying a threshold to the computed probabilities, the pre-existing storms can be associated to the respective SRTs for which the storm-revealing probability is high.

In an embodiment, the system performs a calibrated change-point analysis to separate the regular periods from the environmental disturbance (storm) periods in the first phase. Such separation is completed under the assumption that an environmental disturbance significantly increases the chance of loss-causing events for the affected days. Next, there is computed the difference between the number of SRT expected under non-storm conditions (reflecting the non-storm event rate) and the number of observed tickets (actual event rate) for every identified storm period. This difference provides the basis for calculating the storm-revealing probability.

In a second phase, the system performs enhancing the quality of assignment of tickets to storm IDs by using the set of tickets for which the storm IDs have been already assigned in the database. This information or knowledge can be further used to validate the probabilistic labeling and the model's adequacy.

Figure 6:
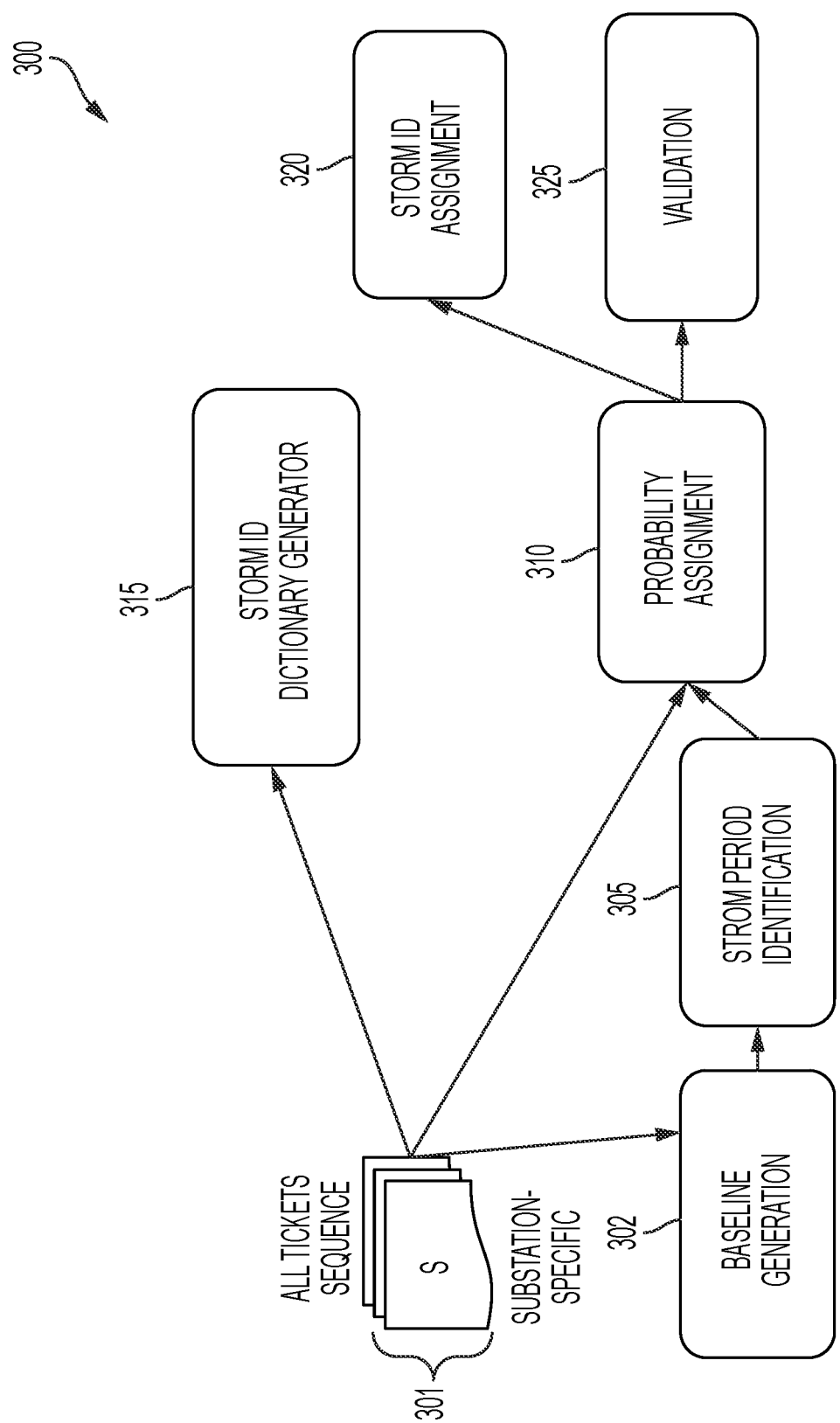
FIG. 6 depicts an overall system architecture for disturbance identification, probabilistic labeling, and assignment of events (tickets) to the prior-known disturbances (known storms in a specific sub-region) using the system of FIG. 3.

FIG. 6 depicts an overall system architecture 300 for disturbance identification, probabilistic labeling, and assignment of events (tickets) to the prior-known disturbances (known storms in a specific sub-region) using framework 100 of FIG. 3. As shown in the system architecture 300 of FIG. 6, there is retrieved a sequence of all trouble tickets 301 that are sub-region specific. From this sequence of tickets, at 302, the system generates a baseline daily rate of the SRTs for every month of every year and for every sub-region.

Figure 7:
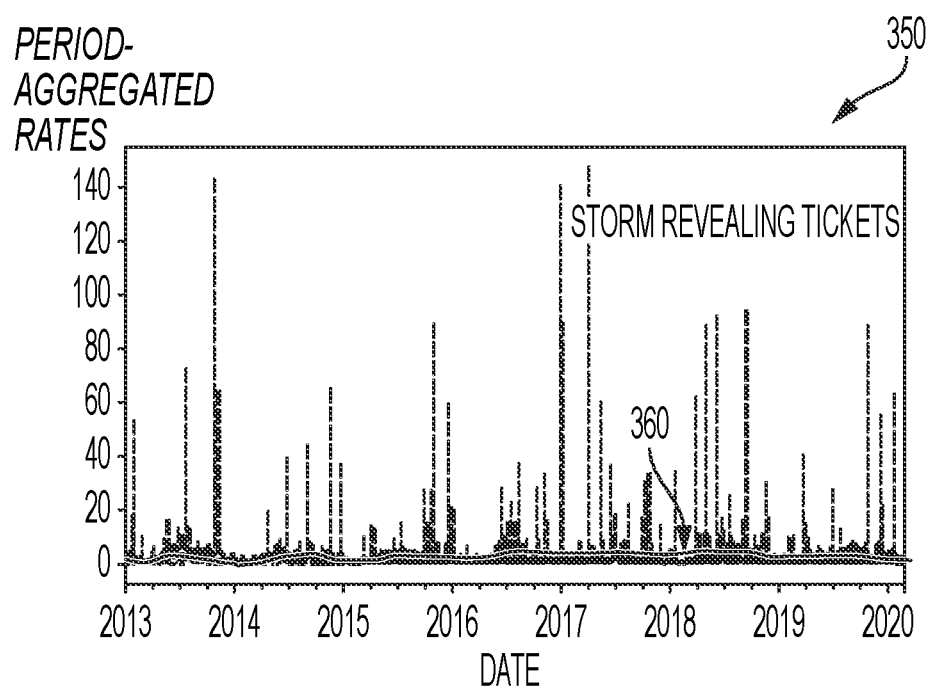
FIG. 7 is a chart depicting a plot of a time series of period-aggregated SRT count rates (Y-axis) for a location-specific sub-region over time (X-axis)

To generate a baseline daily rate from this data, the system performs separating the time sequence of daily counts of SRTs into a set of time series corresponding to an individual sub-region. FIG. 7 is a chart 350 plotting a time series of period-aggregated rates (SRT counts) (Y-axis) for a location-specific sub-region over time (X-axis). In an embodiment, the aggregation is on a weekly or daily basis. In addition to the basic assumption that the SRT family exists, it is assumed that: SRT arrivals follow a non-homogenous Poisson process (NHPP) for all sub-regions. There are two primary sources of non-homogeneity. First, there are "normal" seasonal effects, e.g., including the effect of el-nino years, and even fiscal end-of-year or quarterly considerations that could affect planned ticket handling. Second, there are storm periods during which the SRT rate increases. From the data of type shown in FIG. 7, the method identifies a baseline rate 360, after which, the method is able to identify storm periods.

Figures 8B, 9:
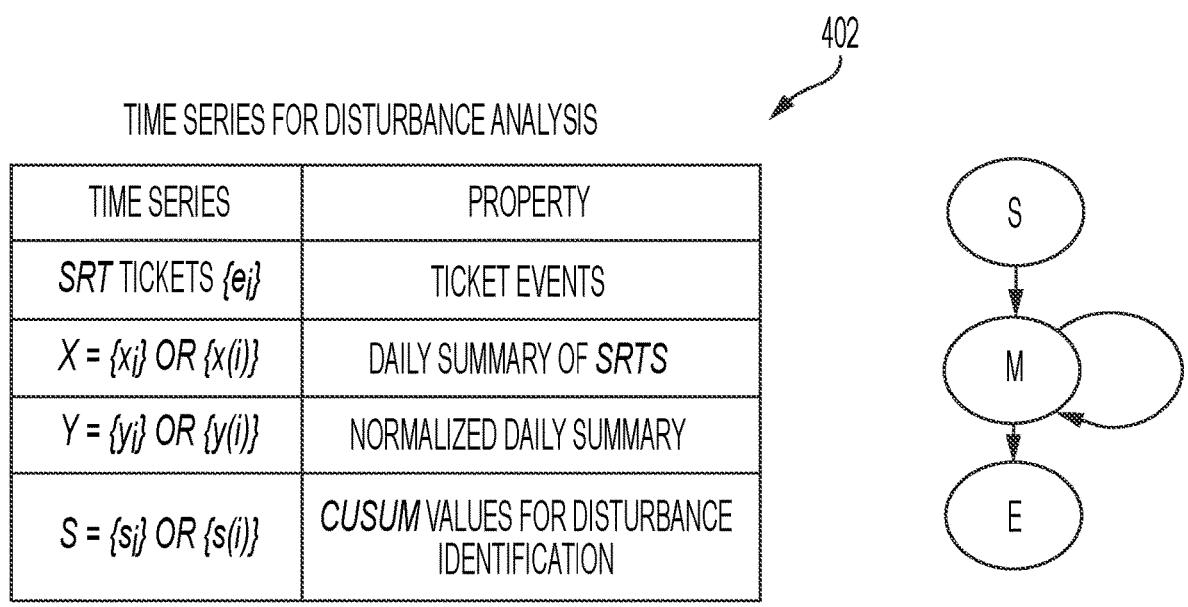
FIG. 8B depicts a table showing a summary of the multiple time series data used in the analyses according to embodiments herein.
FIG. 9 depicts a disturbance lifetime such as a storm having a life cycle involving three states.

Returning to the system architecture 300 of FIG. 6, at a baseline generation step 302, it is assumed that the non-storm periods provide enough information to estimate the daily baseline rate of SRTs, i.e., the rate that would have been observed in the absence of storms. The baseline rate will be location-specific and incorporate the seasonality factors mentioned above. The wrongly pre-labeled tickets form a small fraction of the overall pre-labeled tickets. Subsequently, at 305, FIG. 6, a calibrated change-point algorithm is implemented to identify local storms, i.e., identify the disturbance scale, lifetime, and dynamic status (start, middle and end). At such time, a storm ID dictionary generator process 315 is further invoked to record new storm IDs for newly identified events (e.g., storms) for a specific location or subarea. The Table 400 shown in FIG. 8A summarizes the notation and exemplary default values used in the change-point analyses. The multiple time series used in these analyses are summarized in Table 402 of FIG. 8B.

For baseline generation, the system denotes a baseline rate of the NHPP of SRTs as $\lambda(t)$. For a given time period, e.g., a month, the system obtains the daily counts of SRT tickets as a random variable vector X:

$$X=\{x_i\}$$

where the index i is the date, e.g., within a month. In an embodiment, the estimation applies to months with complete monthly data (so, the available date indices are $i=1, 2, \ldots, D$ where $D >= 28$). Further, the system denotes the mean daily rate (under non-storm conditions) for the month under consideration by k. One objective is to find a robust estimate ($\hat{\lambda}$) based on X. This value is then treated as a baseline for every day in this month, in the considered sub-region.

The method steps for computing ($\hat{\lambda}$) is as follows:

1) Set a trimming number r (e.g., choose the default, r=10), and remove the daily rates of highest r and lowest r from the monthly data. It is understood that the trimming number, r=10, establishes the breakdown value of the estimator: it can handle up to 10 stormy days in any given month without producing an outlier-induced bias. Generally, the trimmed mean gives an unbiased estimate of the central tendency for symmetric distributions. The Poisson distribution is right-skewed, so the conventional trimmed estimator is systemically biased downward as the points removed from the top are more influential than the points removed from the bottom. This bias is bounded, and it tends to a limit b as $\lambda \to \infty$;

2) Calculate the trimmed mean $\overline{X}_{\{r\}} = \overline{X}_{\{10\}}$ by averaging the remaining data points in X;

3) Apply an additive adjustment factor (Bias Correction) b, e.g., b=0.15, to obtain an intermediate estimate according to:

$$\hat{\lambda} = \overline{X}_{\{10\}} + b;$$

4) Correct the robust estimate by preventing it from being too small. To this end, a lower threshold $\beta_l$ is applied, e.g., $\beta_l = 0.2$, where, under non-storm conditions, it is expected, on average, at least one SRT per 5 days for every service sub-region. The new estimate of $\hat{\lambda}$ is computed as:

$$\hat{\lambda} = \max(\hat{\lambda}, \beta_l).$$

With the baseline available for every month of every year and for every sub-region, there is further performed the isolation of the storm periods. To achieve this goal, all the daily rates are standardized so that under the non-storm conditions, they form a sequence of variables that are marginally distributed with mean 0 and standard deviation 1. For a given month, the standardized daily rates $\hat{\lambda}$ yield a set of scores (a time series) $Y=\{y_i\}$ that is related to the original daily rates $X=\{x_i\}$ via the formula according to equation 1 as follows:

$$y_i = \left\{\frac{x_i - \hat{\lambda}}{\hat{\sigma}}\right\} \sim N(0, 1) \quad (1)$$

where $i=1, 2, \ldots, D$, and $\hat{\sigma}$ is a scaling constant to achieve a calibration to a standard Gaussian distribution. In line with the NHPP assumption for the rate of SRTs, $\hat{\sigma}=\sqrt{\hat{\lambda}}$, however the scaling constant $\hat{\sigma}$ can be estimated in a variety of ways. When the monthly series of scores are combined into a single time series, the storm periods will correspond to a segment of elevated values of $y_i$ (values of $x_i$ increase) and these segments can be detected and bounded. Standardization of daily rates enables use of a unified type of algorithm applicable to all the series of scores in the data set.

In an alternate embodiment, rather than computing the daily rate under non-storm conditions for each month and assigning the value to each day of the month, a sliding window can be used within which the same operations can be performed and the baseline computed as a moving average. That is, the procedure is applied to a sliding window (for example, of length=D days) can be used within which the same operations can be performed. The baseline value computed based on this window is assigned to the day i=mid-point of window. Thus, new values are delivered to the baseline curve as the window slides.

Returning to FIG. 6, step 305, there is further performed the identification and isolation of the storm periods. With the baseline values for each month created and converted to the standardized time series (1) of scores, the system is positioned for the local storm identification. In an embodiment, a calibrated change-point algorithm is used to identify local storms. One goal is to automate the labeling of tickets as being storm related or not storm related. As shown in FIG. 9, a storm has a life cycle involving three states: start (S), middle (M), and end (E). For any given day, there is a corresponding state, shown in FIG. 9, chosen from the set [N, S, M, E] with N representing the normal (non-storm) date. Referring back to FIG. 2A, a record 70 corresponding to a single ticket may include an additional storm state attribute chosen from the set [N, S, M, E].

For the time series of scores corresponding to a given sub-region, multiple storms could be observed. They lead to an abnormally high level of scores (relative to the standardized baseline score of 0), persisting for their respective durations. To organize an efficient process of storm period identification, one criterion for declaring a "storm" condition is when the mean of the sequence of scores of equation (1) changes from its nominal level 0 to 1, i.e., the underlying sequence of daily rates undergoes a shift by one standard deviation. With 0 designated as the acceptable level of the mean for the process of scores, there is next applied a form of the cumulative sum (CUSUM) control scheme that triggers an alarm when the beginning of the storm is detected. The one-sided CUSUM process geared to the detection of the process mean upward calls for transforming the sequence of scores (1), which is denoted by $\{y(i)\}(i=1, 2, \ldots)$, to the sequence of control scheme values $\{s(i)\}(i=1, 2, \ldots)$, using the process according to equations 2a, 2b) as follows:

$$s(0)=s_0 \quad (2a)$$

$$s(i)=\max[s(i-1)+(y(i)-k),0], i=1,2,\ldots \quad (2b)$$

and triggering a signal at the first time i for which $s(i)>h$, where $h>0$ is a suitably chosen control limit. In an embodiment, $s_0=0$, however it may be another value $>0$. In t above formula, k is a reference value, e.g., an anchor, which is typically chosen midway between the acceptable and unacceptable levels; in one case, $$k=(\mu_{Y,accept}+\mu_{Y,unaccept})/2.$$

E.g., $\mu_{Y,accept}=\mu_0=0$, $\mu_{Y,unaccept}=\mu_1=1 \rightarrow k=(0+1)/2=0.5$. The reference value k functions to pull the CUSUM downward as the method continues to accumulate the difference between a value of y(i) and k value (where Y is essentially noise of a value around 0 during non-storm conditions). It is noted that the notation y(i) is used instead of $y_i$ to emphasize that time series of equation (1) only covers any given one-month period, while the index i in y(i) represents consecutive days in the multi-year data sequence.

In an embodiment, the threshold h is chosen to achieve the desired trade-off between the rate of false alarms and sensitivity. In an embodiment, the value h can equal 5. However, as the scores Y in equation (1) exhibit some positive skew, and serial correlation, a higher threshold is necessitated to achieve reasonable protection of false alarms. Thus, a somewhat higher threshold, h=6, is used in an embodiment.

Figure 10A:
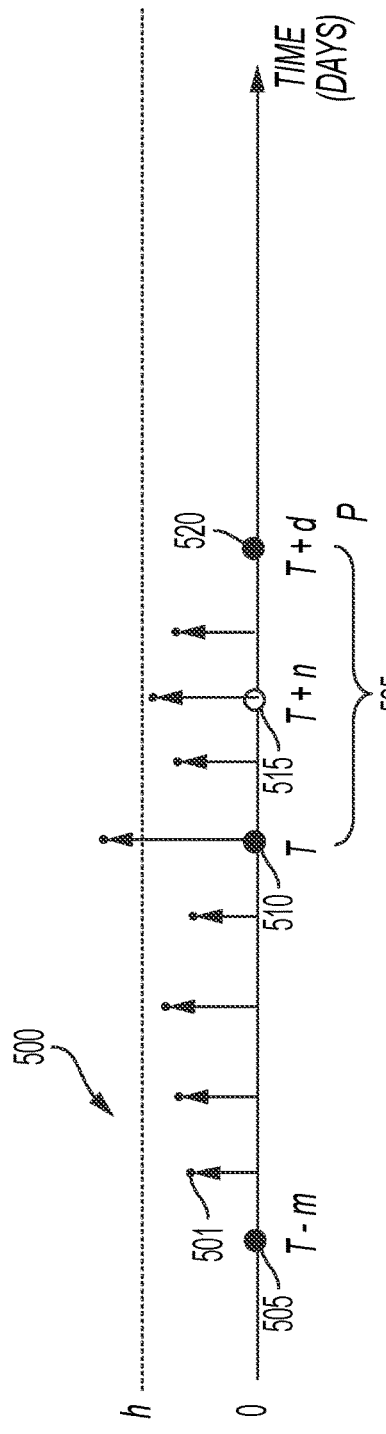
FIG. 10A depicts an exemplary CUSUM control plot of computed CUSUM values plotted against time for illustrating aspects of applying the calibrated change point algorithm used for identifying boundaries of a local disturbance.

FIG. 10A depicts an exemplary CUSUM control plot 500 of computed CUSUM values $\{s(i)\}$ 501 plotted against time and illustrates aspects of applying the calibrated change point algorithm used for identifying boundaries of a local disturbance (e.g., storm). In an embodiment, there is calculated a CUSUM time series based on Y and two parameters (k=1 and h=6) as shown in table 400 of FIG. 8A. For a substation, the algorithm starts from the beginning date of the tickets recorded and the system creates a CUSUM time series of values 501 for disturbance identification, i.e., $S=\{s_i\}$, and identifies an initial indicator for storm. With the knowledge of the CUSUM time series and the indicators of discovered storms, the system establishes the beginning and ending dates of each storm period.

As shown in the computed CUSUM values control plot 500 of FIG. 10A, for a known storm indicator corresponding to a date T 510, the system first defines a neighborhood of the storm indicator as [T−m, T+n] as shown along the x-axis. The CUSUM value 505 for $S_{T-m}=0$ is the last zero-valued scheme point before the date T 510. The value $S_{T+d}=0$ is the first zero-valued scheme point 520 after the date T (e.g., where $0 \leq n < d$). The case for n=0 only exists when d=1. In view of equation (2b), the CUSUM values $s_i$ do not creep below a value of 0 in non-storm conditions as shown in FIG. 10A. As the values of Y become systematically bigger than 1 during storm conditions (e.g., $Y \geq 2$), the CUSUM values $s_i$ 501 increase. In an embodiment, as shown in FIG. 10A, when the CUSUM value attains a value exceeding the threshold h at time T at 510, there is triggered a declaration of a storm condition. In an alternate embodiment, the beginning point of the disturbance at the time can be determined based on additional information that may come into play after an amount of additional time has elapsed (e.g., additional information about wind speeds), or the assessment of the starting point can be re-assessed as the situation develops.

While the system enables detection of the first storm in the time series and its point of origination with confidence—to declare the "end of the storm," and thus produce both the beginning and endpoints of every storm window in the series leading to the labeling of states $s_i$ as shown in FIG. 10A, a modified CUSUM procedure is implemented that involves, among other things, an automatic re-starting of the CUSUM process (2a, 2b) at every point of the signal. That is, tor the CUSUM calculation, this current CUSUM value for T will be reset as zero for next date point. In an embodiment, in FIG. 10A, a re-start occurred at the point T 510 of the storm declaration, but no other re-start occurred before the "end of episode" was declared at point 520. At that point, T+n 515 was declared as the last day of the storm.

In the modified CUSUM process the procedure for storm period identification, is according to equations (3a, 3b) as follows:

$$s(i)=\max[s(i-1)+y(i)-k,0] \text{ when } s(i-1) \leq h \quad (3a)$$

$$s(i)=\max[s_0+y(i)-k,0] \text{ when } s(i-1) > h. \quad (3b)$$

In equation (3b), there is considered the first event of the threshold (h) exceedance as the signal that the storm has started in the sub-region under consideration. Here, $0 = < s_0 < h$. Thus, process s(i) produces cycles (all ending in exceedance of threshold h), and there may be several cycles as long as the disturbance continues. Eventually, there will be a cycle 525 in which the value s(i) reaches 0 before hitting the threshold—and at this point the system declares that the storm ended somewhere in this cycle. So, this will be the "end-of-episode" decision point, e.g., at time T+d. Then, the method starts searching for the point within the last cycle where it is believed the storm actually ended. In FIG. 10A, this is the at time 515.

That is, after a first event of the threshold (h) exceedance as the signal that the storm has started in the sub-region under consideration, subsequent threshold violations (when they occur reasonably soon after the preceding ones) will serve as an indicator of the continuing storm. Eventually, the temporal cluster of threshold violations will stop, which will serve as a basis for declaring the storm episode. At this point, the storm boundaries can be declared. In particular, for a known storm indicator corresponding to the date T, the storm period is thus the temporal neighborhood [T−m, T+n]. The CUSUM value of s(T−m)=0 is the last zero-valued scheme point before the T. Letting s(T+d)=0 be the first zero-valued scheme point after storm discovery at time T and let time (T+n) 515 correspond to the maximal CUSUM value in the period P [T, T+d] 525, then the storm ending date is defined as the (T+n), as the CUSUM trajectory indicates that the ticket rates after that time are consistent with the baseline process. The identified storm length is thus l=m+n+1.

In an embodiment, as long as the storm continues, the CUSUM values will have a tendency to increase and exceed the k=1 reference value. The CUSUM value will thus trend floating upwards until the threshold is exceeded (alarm triggered). At such time, the s(i) value is reset after the alarm trigger. In an embodiment, may be reset to a value so between 0 and threshold value h. Thus, the CUSUM process and re-setting of the s(i) value will continue as long as storm conditions continue and their values tend to increase and keep exceeding the threshold. The resetting of the s(i) after the alarm triggering can occur multiple times (due to the resetting) as disturbance conditions continue. Once the scores Y become smaller, the trajectory will start going down until such time as time T+d 520 and the basis for declaring the end point of the storm disturbance period is at time T+n 515 after which the values tend melting down.

In an alternative embodiment, regarding the right end-point of the disturbance window, a determination can be made at the time T+d (and then find the point T+n as the suitable end point). However, multiple alternative strategies exist. For example, additional data may be collected before making the decision that the disturbance episode is over.

Figure 10B:
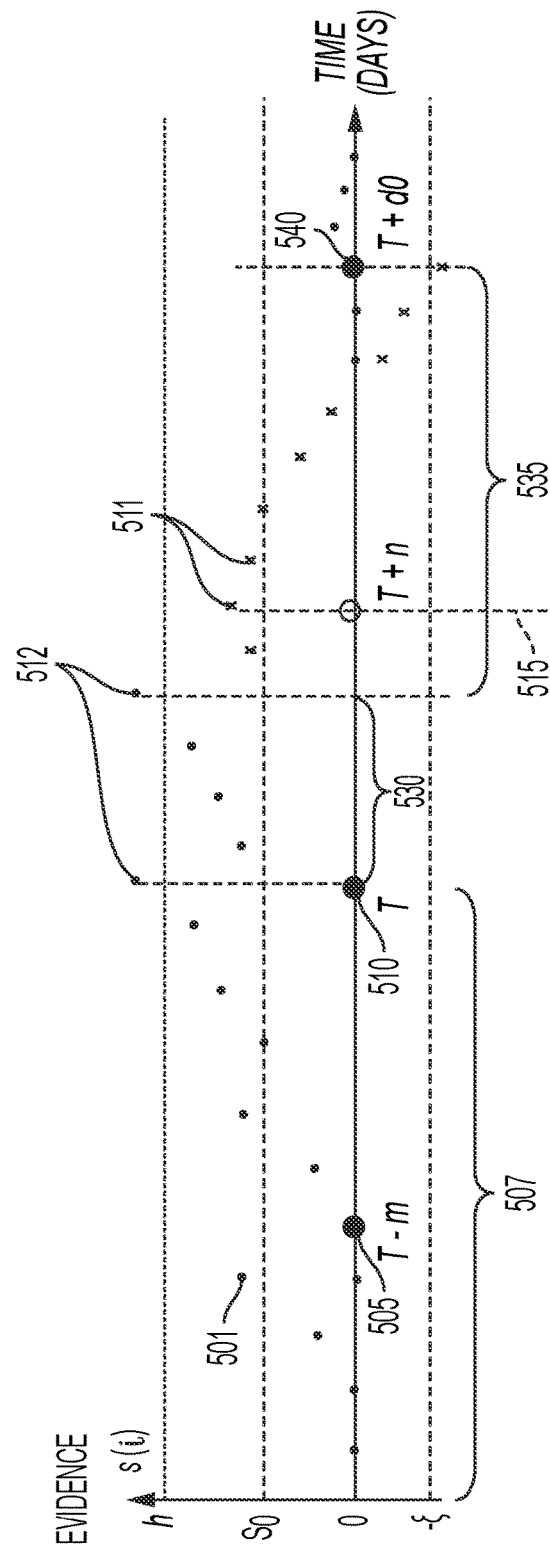
FIG. 10B depicts an exemplary CUSUM control plot of computed CUSUM values in a first alternative instance.

For example, in a first alternative instance, the estimating of the disturbance boundaries is based on use of "twin" processes, s(i) and s*(i) with a variable $\xi$. That is, after restart at $s_0$, the process s(i) of equation (2b) can be run. However, a parallel process s*(i) is activated which also starts from $s_0$ and is the same as s(i) except that it is not bounded from below by 0. Rather, it is permitted to go into the negative territory. So, this formula becomes: s*(i)=s*(i−1)+y(i)−k. FIG. 10B shows s(i) values 501 depicting a pre-detection period 507, the point of disturbance detection T 510, the point of disturbance origination 505 (T−m), a first cycle 530 after detection 510, a second (and last) cycle 535 after detection of a second re-start point 512, and the last point of disturbance 515 (T+n) based on the process s(i). FIG. 10B also shows s*(i) values 511 using an "x" symbol (only for the last cycle) which are non-reflected CUSUM values. FIG. 10B further indicates the decision point occurring when s*(i)<$\xi$ where $\xi$>0 defines a horizontal strip below 0. In the example shown, at time 540 (T+d0) is the point of "end-of-episode" decision that the disturbance ended somewhere within the second cycle 535. Thus, in this alternative instance, s(i) reaching 0 in the last cycle is not sufficient to declare the end of the disturbance episode, i.e., additional time may elapse until s*(i)<$\xi$. After that, a search can be conducted to find the maximal value of s(i) as in FIG. 10B to establish the endpoint.

Figure 10C:
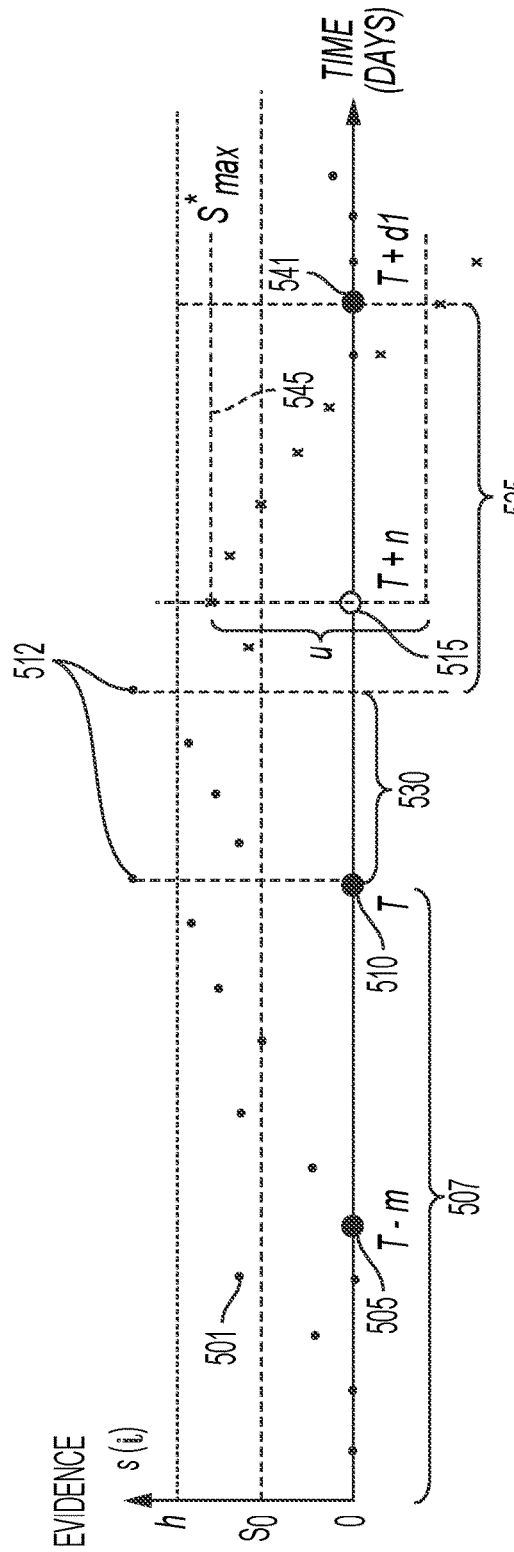
FIG. 10C depicts an exemplary CUSUM control plot of computed CUSUM values in a second alternative instance.

In a second alternative instance, the estimating of the disturbance boundaries is based on use of "twin" processes, s(i) and s*(i) with a variable u. That is, after a restart at so, the process s(i) of equation (2b) is run. However, besides computing the s*(i) values 511 as depicted in FIG. 10C, the system further computes an additional difference between the maximal value of s*(i) in the current cycle ($s^*_{max}$) 545 and s*(i). When $s^*_{max}$−s*(i)>u (where u>0 is some suitable threshold), then the end of the disturbance episode can be declared, and the method can seek out the maximal value of s(i) as in FIG. 10B to establish the endpoint. Here, time 541 (T+d1) is an "end-of-episode" decision point 540 that the disturbance ended in the $2^{nd}$ cycle 535 and becomes the last point when time point T+n 515 is established. Note that in the meantime, s(i) can be run as usual and it could exceed h, triggering a new cycle at re-start points 512.

Figure 10D:
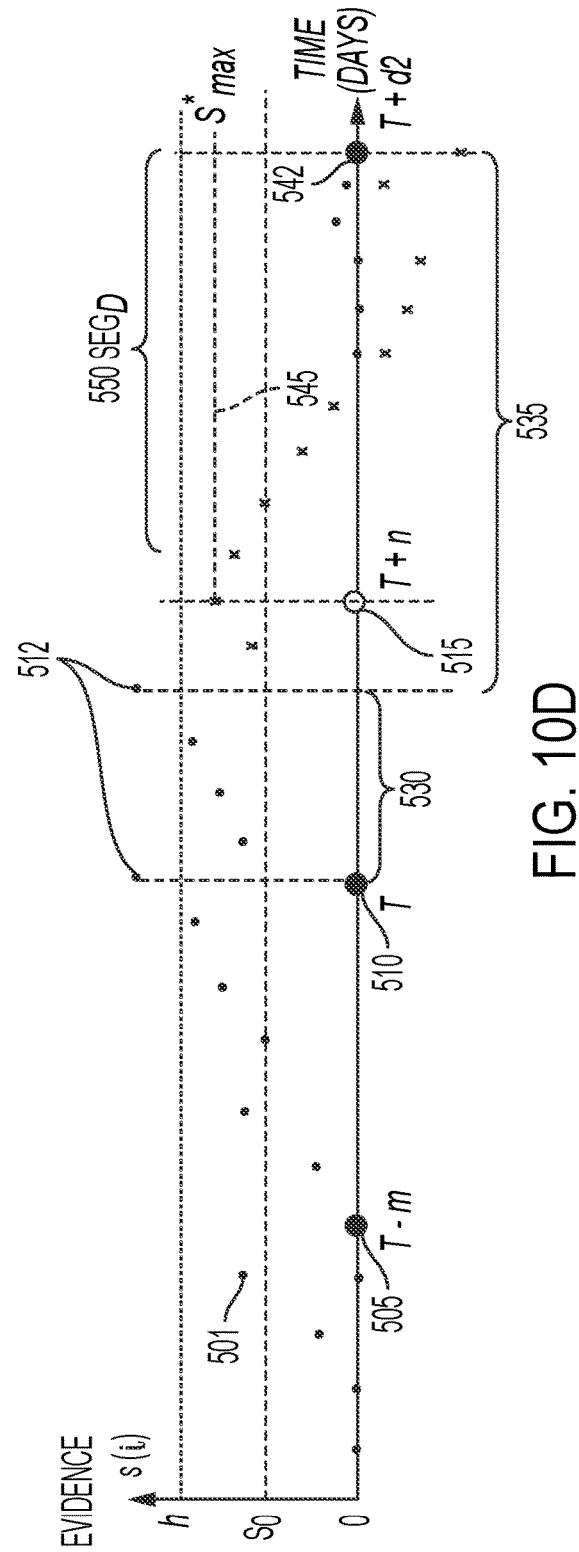
FIG. 10D depicts an exemplary CUSUM control plot of computed CUSUM values in a third alternative instance.

In a third alternative instance, the estimating of the disturbance boundaries is based on use of "twin" processes, s(i) and s*(i) with a significance level threshold value $\alpha$. That is, after restart at so, the system monitors the position of $s^*_{max}$ and evaluates the points y(i) that correspond to the process after $s^*_{max}$. Only when these points show a sufficiently low measure of central tendency (e.g., mean) as confirmed by statistical tests, will an "end of episode" decision be made. Then the system can look for the maximal value of s(i) as in FIG. 10D to establish the endpoint. That is, to explore whether "end of episode" should be declared at time 542 T+d2, the system extracts data y(i) corresponding to data segment $SEG_d$ 550 as shown in FIG. 10D and performs a statistical test confirming the "end of episode" (i.e. return to baseline conditions) with some level of confidence, e.g., by: 1) testing the hypothesis $H_0$: mean of y(i) within segment $SEG_d$ 550 is in the target zone of the baseline, with some level of confidence, for every point in the segment $SEG_d$ vs. an alternative: $H_1$: mean of y(i) is in zone corresponding to disturbance, for at least one point in segment $SEG_d$ 550; and 2) determining if $H_0$ cannot be rejected at some pre-specified level of significance value $\alpha$—then declare "end of episode", establish T+n as last point of disturbance and close cycle. In another example embodiment, this can be formalized as follows: given test hypothesis $H_0$: $\mu y > \varepsilon \geq 0$ for some sub-segments in the last data segment $SEG_d$ as compared to hypothesis $H_1$: $\mu y \leq \varepsilon$ for all sub-segments. If $H_0$ can be rejected at significance level $\alpha$, then an "end of episode" is declared, and T+n is established as endpoint, and the cycle is closed. It is understood that other measures of central tendency can be used instead of the mean.

Generally, in deciding an end of the disturbance episode, other factors could be taken into account, including external information. However, generally, it is the maximal value of s(i) in the last cycle that determines the end point of the disturbance. This point can be adjusted to the right to include other points for which the elevated score y(i)>0 is observed.

In embodiments, the estimating of the starting point T−m of disturbance as the first point of a signal-triggering trajectory introduces a positive bias. This can be addressed by expanding the starting point leftward by including additional points (sequentially) as long as the data values Y(i) support the hypothesis of elevated rate, e.g., a. as long as $Y(i) > \mu_0$, or
b. as long as hypothesis of disturbance is supported vs baseline (can use process similar to that of establishing T+d, $s^*_{max}$ and T+n, but going leftward).

In embodiments, for the dynamic boundary adjustment: the system may not be obliged to set the starting point at the detection time T. That is, disturbance boundaries can be adjusted as new information comes in, e.g., new information corresponding to tickets observed, e.g., in a month's time, could lead, through study of the time series of the baseline and seasonality effects, to re-evaluation of the baseline for that month a year ago- and analysis with the revised baseline could lead to revised boundaries of storms observed back then.

Further enhancements are possible based on area-specific disturbance patterns. For example, for storm disturbances, it might be known that the effects appear within a short time but fade out gradually.

Moreover, in further embodiments, covariates can be incorporated into the method, e.g., via baseline adjustment.

FIG. 11 illustrates an example pseudocode 600 of the calibrated change-point method in which time points are obtained as illustrated in FIG. 10A to establish storm boundaries. As shown, after initializing s_previous=s(0)=$s_0$, a FOR loop is entered at 601 and s(i) is continuously re-computed at 610 for each index i (days of the month) as a function of the difference between the y(i) score and the k reference value as in equations (3a), (3b) without dropping below a value 0. At 620, the determination is made as to whether the s(i) value exceeds the threshold h. If s(i) value does not exceed the threshold h, then s(i) takes a previous value at 625. At such time the threshold is exceeded, the storm condition is declared, the procedure is restarted and s_previous can be reset to $s_0$ at 622. However, in the alternate embodiments, if the threshold is exceeded, at 622, the CUSUM value s_previous can be assigned a value somewhere between 0 and threshold value h. Thus, the resetting of s(i) when (s>h) does not have to be necessarily restart at a value 0, but at an intermediate value $s_0$ between 0 and threshold value h.

Returning to FIG. 6, after having identified the storm in a sub-region (e.g., a local storm) and established the storm period using the CUSUM process S={s(i)} at 305, the next task at 310, is to provide the storm-related probability for the SRTs corresponding to the declared storm window. In an embodiment, a model-driven allocation formula for events is used to assign the probability of the event to be related to one of the disturbances. To deliver a probability that an SRT is storm-related, and given that a fundamental property of an NHPP process is that itself is a superposition of NHPP sub-processes driven by their own intensity functions, $\{\lambda_j (t)\}, j=1,2,\ldots,J$, then when an event occurs, the probability that it is caused by the sub-process j is given by $\lambda_j(t)/\lambda(t)$, where $\lambda(t)$ is the total intensity. The probability p that an SRT issued on day i is disturbance-related can be computed according to equation (4) as follows:

$$p = p(i) = \max\left[\frac{x(i) - \hat{\lambda}}{x(i)}, 0\right]. \quad (4)$$

Here, $\hat{\lambda}$ is the month-specific estimated daily baseline rate and x(i) is the daily rate of SRTs. For the SRT tickets outside of any local storm, the method assigns the storm-related probability as p=0. This approach is used to assign probabilistic labels to SRTs.

Further, in FIG. 6, at 320, after having assigned probabilistic labels to the SRTs, a next step is to assign the SRTs to known storms. This can be achieved using a derived dataset of known storms. For every known storm ID, this dataset provides the total number of tickets assigned to it, the estimated beginning and duration of the storm, and the number of affected sub-regions. With the storm-revealing probability (p) calculated for each SRT, any given ticket can be associated to a known storm as follows. Given a storm period of D is [$T_1$, $T_2$], then the set of SRTs that belong to this storm is defined according to equation (5) as follows:

$$\{e | T_1 - \varepsilon_1 \leq t \leq T_2 + \varepsilon_2, p \geq p_0\} \quad (5)$$

where ($\varepsilon_1$, $\varepsilon_2$) provide uncertainty-related buffers and default to (1,1) as shown in table 400 of FIG. 8A and define the extended storm period and $p_0$ is a probability threshold. In an embodiment, the value $p_0$=0.5 is a suitable implementation of a probability threshold.

Further, returning to FIG. 6, at 325, after having assigned the SRTs to known storms, a next step is to validate the results of probabilistic labeling and storm identification procedures. In an embodiment, human experts can be used to validate whether the detected storms should indeed be classified as storms and whether high storm-related probabilities assigned to the tickets are warranted.

In an embodiment, a workable procedure that (a) re-discovers and handles labeling for the known storms and (b) discovers a dominant fraction of missed storms and labels the corresponding tickets is implemented. The validation of (b) can be achieved with the help of human experts, and the tuning of parameters of Table 400 and FIG. 8A. That is, a manually tuning of the parameters set forth in Table 400, FIG. 8A, is performed to achieve metrics that a customer finds satisfactory.

Figure 13:
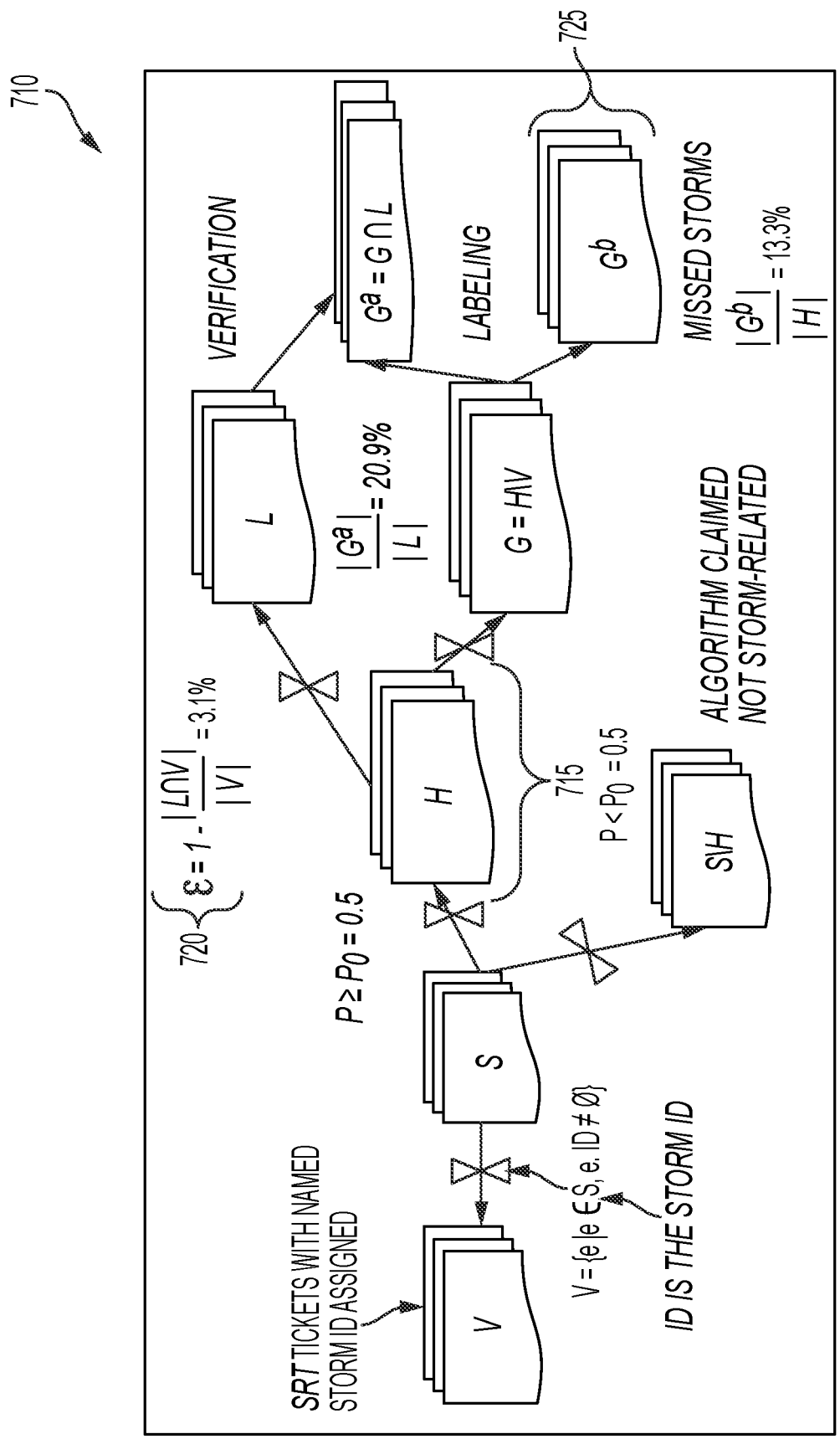
FIG. 13 is a diagram of key metrics used for the validation process according to an embodiment herein.

FIG. 12 depicts a diagram 700 of the data subsets used in a validation process and particularly depicts a utility company's ticket categorization. FIG. 13 is a diagram of key metrics 710 used for the validation process. Of importance is the subset H 715 of SRTs with high storm-related probabilities, i.e., $p \geq p_0$ for some threshold $p_0$. H is used for the validation of the probabilistic labeling. The validation process identifies a subset of H containing tickets lacking the storm ID, for which a matching storm ID can be found using the method of equation (5). The focus then becomes on the subset of H which cannot be associated with any known storms. This subset enables the assessment of the degree of completeness of the known storm list, and further helps to identify and characterize the missed local storms. The tickets in set L can be used for the fully automated part of the validation process. The SRTs in L satisfy the following properties: i) high storm-revealing probability $p \geq p_0$; ii) have labels assigned based on (5). This part of validation is based on the comparison between L and V (i.e., the set of all pre-labeled SRTs). In an embodiment, there is first needed to have a near-complete coverage of $L \supseteq V$. Second, it is needed to ensure that labels of tickets in V based on equation (5) coincide with the original storm ID. Then the method computes a divergence measure 720 according to equation (6) as follows:

$$\epsilon = 1 - |L \cap V|/|V|, \tag{6}$$

where divergence measure E indicates the fraction of the pre-labeled tickets that are not recovered by the probability-based labeling process. Using the default procedure parameters in Table 400, it is observed that $\epsilon = 3.1\%$, which confirms the nearly complete reconstruction of the storm IDs.

In an embodiment, a low value of $\epsilon$ by itself is not sufficient to declare the procedure successful: i.e., there is also a need to ensure that the system does not "discover" storms that any validator disagrees with. The main instrument here is the signal level h of the CUSUM procedure: if this level is set too low, the rate of such false discoveries may be increased.

Thus, with respect to the step of labeling SRTs with missing storm IDs, FIG. 13 is a chart depicting key metrics of the validation process. As shown in FIG. 13, while $\epsilon$ 720 measures the ability to reconstruct pre-known labels, in a further embodiment, the framework provides the labeling of tickets that have no disturbance (e.g., storm ID) assignment. For example, while the system identifies a subset L of SRTs with high storm-related ($p \geq p_0$) that can be associated with the extended known storm periods, not all the tickets in L require labeling—only those lacking known storm ID need to be labeled. This set of newly discovered storm-related tickets is denoted as $G^a$. So, the ability to discover storm-related tickets that fall within a general vicinity of known storms is characterized by the formula according to equation (7) as follows:

$$\eta = |G^a \vee L|/|L| = |(HV) \cap L \vee L| \tag{7}$$

The analysis using the default parameters of Table 400, FIG. 8A yields $\eta = 20.9\%$ newly discovered storm-related tickets associated with known storm period. These tickets are subsequently validated by experts, and in response to any disagreement with the induced labeling, may require adjustment of some parameters.

Finally, there is another class of newly discovered storm-related tickets that have a high storm-related probability $p \geq p_0$, but cannot be associated with any known storm using the process of equation (5). This subset of SRTs is denoted by $G^b$ 725, as shown in FIG. 13. The ability to discover missed storms and related tickets is thus characterized according to equation (8) as:

$$\xi = |G^b \vee H| \tag{8}$$

This analysis yields $\xi = 13.3\%$, suggesting that the list of known storms is not yet complete. The framework further identifies missed storms and gives them artificial names, performs ticket labeling within them, and validates the findings, e.g., using experts.

Afterward, based on the probability generated and whether it falls into a known disturbance period, the service tickets are relabeled. That is, as shown in FIG. 2B, as a result of the processes of FIG. 6, the system outputs a modified record which includes the information of the detected storms and including the probabilistic labels. That is, as shown in FIG. 2B, the system returns an example record 90 that includes additional populated fields including a field 93 populated with an identified storm with a substation and corresponding times, a storm status field 95 which includes an indication from the set [N, S, M, E], the computed probabilistic labeling, e.g., value of 0.95, shown in field 96, and a known storm ID field 98. As shown in several of the example returned records 90, there have been found high probability tickets not associated with knows storms as indicated by no known storm ID label 97A, and high probability tickets associated with known disturbances (storms) with a storm ID label shown at 97b.

Figure 14:
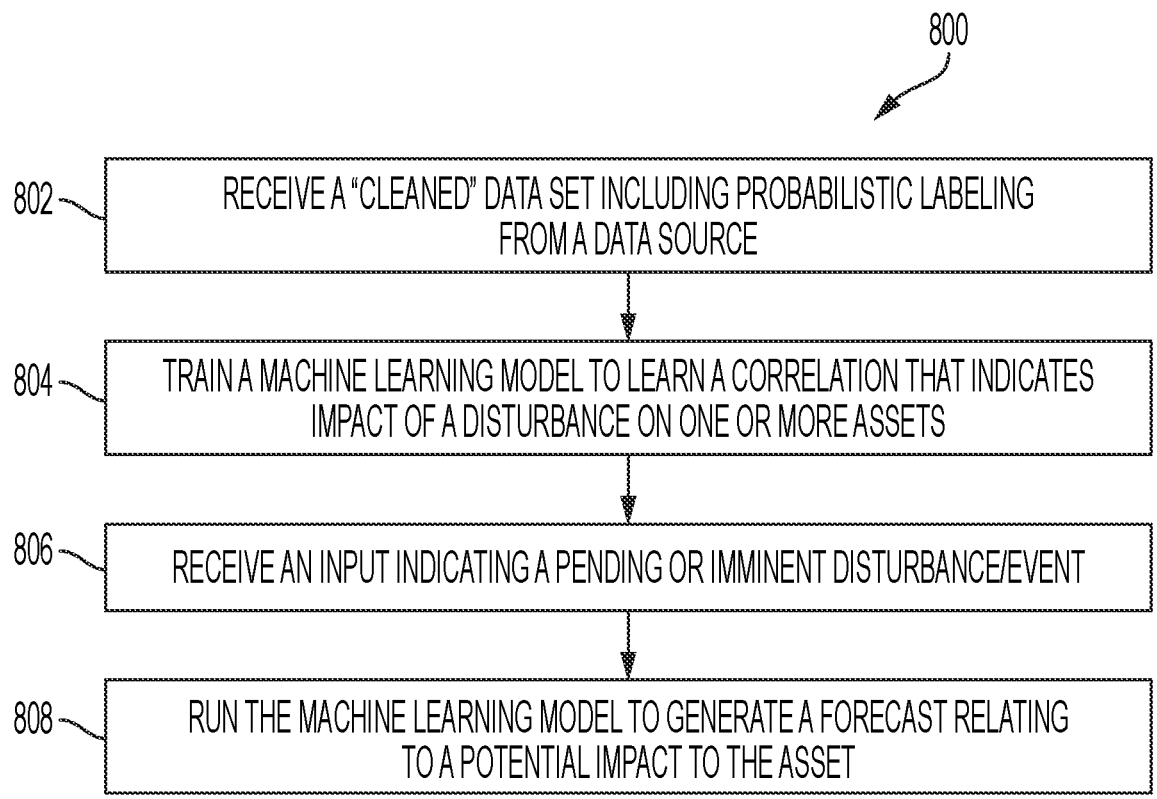
FIG. 14 is a flow diagram illustrating a process that can be performed by a processor to implement a preventative action using a machine learned model according to an embodiment.

FIG. 14 is a flow diagram illustrating a process 800 that can be performed by a processor to implement a preventative action using a machine learned model according to an embodiment. An example process may include one or more operations, actions, or functions as illustrated by one or more of blocks. Although illustrated as discrete blocks, various blocks may be divided into additional blocks, combined into fewer blocks, eliminated, or performed in parallel, depending on the desired implementation.

Processing can begin at block 802. At block 802, a processor can receive a data set of increased accuracy including records having probabilistic labeling obtained using the processes described herein from a data source corresponding to a particular domain. Processing can continue to block 804. At block 804, the processor can train a machine learning model to correlate an impact of a disturbance on one or more assets. The machine learning model can be operable to generate forecasts relating to performance metrics of the one or more assets based on the trained machine learned model. In an example, the machine learning model can be a neural network with hidden layers.

Processing can continue from block 804 to block 806. At block 806, the processor can receive an input indicating an predicted disturbance (e.g., storm) or weather condition/pattern. Processing can continue from block 806 to block 808. At block 808, the processor can run the machine learning model to generate a forecast relating to a performance metric of the asset or a particular impact upon an asset given the forecast disturbance, weather condition or pattern. In some examples, the processor can further run the machine learning model to generate interpretations of the forecast, where the interpretation can be indicative of importance to the asset(s) of the service company.

In an embodiment, for probabilistic labeling for the events related to a disturbance, the example is used from the area of management of weather-related power outages to illustrate the problem. By way of example, environmental disturbances (e.g., weather storms, blizzards, and electromagnetic disasters, etc.) can significantly impact an infrastructure system's service capability and quality (utility system, sensor network). However, the environmental disturbances scale depends on the location-specific weather or electromagnetic conditions (e.g., wind speed, wind gusts, total precipitation). The robustness of infrastructure also plays a significant role in whether such an environmental disaster interrupts the service or damage the devices.

In a non-limiting example embodiment, the general framework provided herein uses location-specific maintenance or failure tickets in conjunction with weather data (or monitored electromagnetic data) to identify those environmental disturbance events and make them useful for future planning and infrastructure improvement (e.g., underground wiring, electromagnetic shield mechanism, etc.).

While the labeling of SRTs to prior existed storms as described herein addresses the data quality issue, however, in many cases, the primary objective for a utility company is to achieve the best predictive capability for outages related to an upcoming storm. Based on the data from previous storm events and the expected storm duration, the system obtains the distribution for the number of tickets of various causes (for any given storm and sub-region). The quality of the prediction depends on the policy of assigning probabilities to tickets observed previously. Combined with the weather monitoring, models could be run to also predict the number of affected customers, the costs, or resources required to mitigate the storm's effects within a timeframe of interest.

The general framework provided herein further facilitates longer-term planning and resource allocation to make the infrastructure more storm-resistant. For example, for every approaching storm, the trained model could be used to suggest preventive measures to mitigate storm outcomes: for example, if it is established that pole fires are more likely to occur during storm periods, actions to remove potentially threatening debris from connectors prior to the storm could help in that respect; if leaning trees are the cause of an excessive number of within-storm tickets, one can take/preemptive measures to address this threat too.

The general framework further handles disturbance over the spikes of accident tickets, maintenance, and QoS log data. In one aspect, the processing results of the general framework enable utility companies to always be prepared for the weather storm (disturbance). The method automatically assigns all the tickets with proper storm ID (e.g., a disturbance ID); Furthermore, as there is a set of data quality problems that share a common abstraction—the general framework implements methods to assign the disturbance as the causes for tickets or QoS log events.

Thus, in an embodiment, the system 100 and probabilistic labeling framework for power utility data that results in automatic labeling of the power outage tickets and storm period identification can ultimately lead to answering questions of type: How many storm-related tickets are expected in each period of time, by substation? What are contribution of infrastructure factors (number of poles, transformers, miles of lines) to the cost of outages? What are contribution of Geographic features? Effect of weather-related variables (precipitation, wind speeds, wind gusts)?

While the framework is general, applications with similar data structures, and driven by similar stochastic models, are abound. Thus, analyses can be extended to cover broader classes of models and system features. For example, modeling the arrival process of service tickets as an NHPP can be expanded to cover a range of possible components, covariates, and dependencies once sufficiently rich and reliable data sources become available. Specifically, in the problem of weather-related outage management, one could take advantage of the additional data that reflect weather conditions in the affected sub-areas, such as wind speeds and directions, strength and duration of wind gusts, barometric readings, or amounts of precipitation that are often available from weather stations located in the proximity of the service sub-areas. However, the task of incorporating such data is quite complex and is the subject of ongoing research.

One set of applications arises in the development, management, and maintenance of infrastructure companies. The power utility case discussed herein can be adapted to handle companies' problems managing transportation networks, water resource management, or construction projects. In manufacturing, the methodology could be used to manage sensor networks deployed by IoT to service chemical and related industries.

Other examples of possible application areas include but are not limited to use cases such as: technology (e.g., in the analysis of computer network overloads and other phenomena arising in QoS assurance), insurance claims (where disturbances are typically associated with an unusually high volume of claims), or financial services, where events correspond to transactions. These use cases share similar challenges and require solutions involving a system framework running an algorithm to associate a ticket or log event to a disturbance.

Thus, for the example use case of computer services, the system receives data records (i.e., tickets or log events) including, but not limited to: Service QoS logs and tickets for service (e.g., service delay, I/O error, and service failures). The metrics include a) router network traffic; b) Storage Latency; c) CPU utilization; d) Memory Usage; e) Service traffic; f) TTL (lifetime of the traffic). The particular disturbance can include but is not limited to: a network attack, expected or unexpected spikes of service activity; a web service attack; a network breakdown; a CPU overutilization, intensive I/O errors due to storage malfunction; the breakdown of the Internet Route (delay of communication). The problem statement addressed using such a framework can be: 1) How to associate the QoS tickets to the known disturbances; and 2) Identify and classify disturbances based on streams of tickets or event logs.

For the example use case of insurance applications, the system receives data records (i.e., tickets or log events) including, but not limited to: Service Requests, such as claims; enrollments; and withdrawal of life and term insurance. The particular disturbance can include but is not limited to: a pandemic (e.g., such as (Coronavirus)), an economic crisis, local economic changes (e.g., a shutdown or opening of a business or plant). The problem statement addressed using such a framework can be: 1) Identify the root cause of service requests; identify the impact of such causes; and 2) Identify unknown disturbances impacting the business.

For the example use case of financial applications, the system receives data records (i.e., tickets or log events) including, but not limited to: requirements to buy or sell specific stocks or adjustment of portfolio. The particular disturbance can include but is not limited to: positive or negative news, market disturbances from international, domestic, political, or economic events. The problem statement addressed using such a framework can be: 1) Link the motivation of financial activity through the association of disturbance to request; 2) Identify the undiscovered reasons (e.g., hidden disturbances) for unusual financial activities.

For the example use case of a help desk Service, the system receives data records (i.e., tickets or log events) including, but not limited to: Tickets (e.g., service companies provide call services. For example, each call is tagged with New patch applied to an existing Windows deployment. The particular disturbance can include but is not limited to: an unusually intensive stream of incoming tickets indicates that many of them are related to a common cause. A new software application; a service breakdown; a new patch applied. The problem statement addressed using such a framework can be: The help center needs to understand the cause of each ticket (time and nature). Thus, it becomes necessary to identify and categorize the disturbances based on data, to enhance the efficiency of operations.

Figure 15:
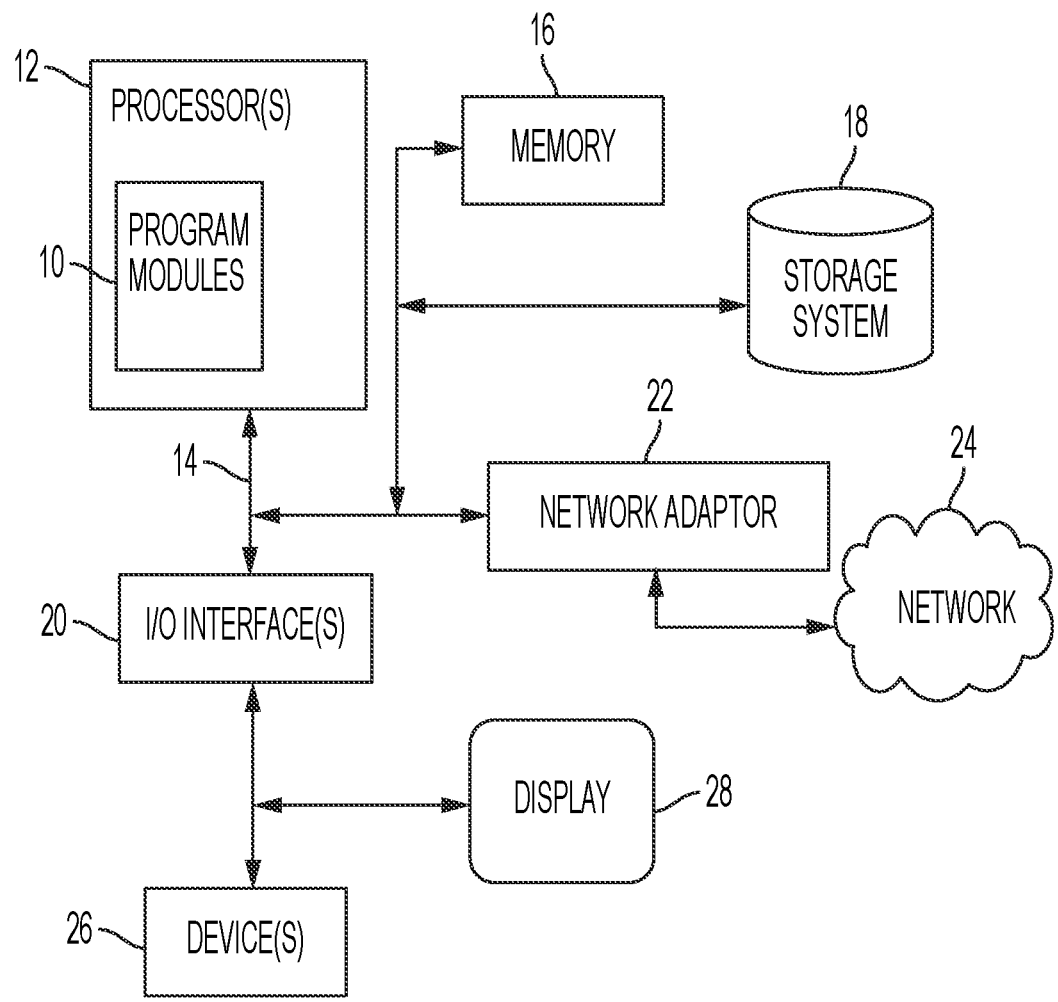
FIG. 15 illustrates a schematic of an example computer or processing system that may implement probabilistic labeling of service tickets in one embodiment of the present disclosure.

FIG. 15 illustrates a schematic of an example computer or processing system that may implement probabilistic labeling of service tickets in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a modules (e.g., machine learning module) that performs the methods described herein. The modules may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a processor comprising hardware, the processor is configured to be in communication with the memory, and the processor is configured to:
receive a set of service records from a data source, one or more service records corresponding to a plurality of weather-related service disturbance-revealing events of a specified region occurring during a time period, one or more service records being mislabeled or having no label relating to an associated weather-related service disturbance;
determine an observed actual event rate for weather-related service disturbance-revealing events of the time period;
determine a baseline mean periodically-aggregated rate of expected service related records under non-disturbance conditions of the time period;

determine a set of standardized periodically-aggregated scores as a function of the baseline mean periodically-aggregated rate and observed actual event rate during the time period;
apply a calibrated change-point analysis to identify a weather-related service disturbance time window based on changes of score values in the set of standardized periodically-aggregated scores detected during the time period, said identifying comprising applying a calibrated change-point analysis to separate a non-disturbance condition of the time period from a disturbance condition of the time period, wherein the applying a calibrated change-point analysis to identify a disturbance time window comprises:
 generate an auto-restarting cumulative sum chart having a sequence of control scheme values for disturbance identification, said sequence of control scheme values being transformed from corresponding score values in the set of standardized periodically-aggregated scores and modified according to a cumulative sum reference parameter;
 identify a time when a control scheme value exceeds a sensitivity threshold parameter value;
 determine an end of episode condition that establishes a bound for an end time of said disturbance condition and determine an end time of said disturbance time window based on the identified time in said auto-restarting cumulative sum chart;
 determine a beginning of episode condition that establishes a bound for a start time of said disturbance condition and determine a start time of said disturbance time window based on the identified time in said auto-restarting cumulative sum chart; and
 automatically re-start a transforming of said sequence of control scheme values from corresponding values at each identified time a control scheme value exceeds a sensitivity threshold parameter value; and
generate a disturbance-related probability for the service records corresponding to the identified weather-related service disturbance time window;
re-assign a label, based on the generated probability, to a service ticket as being related to the identified weather-related service disturbance time window;
obtain, based on re-assigned labels to service tickets for identified weather-related service disturbance time windows associated with past storms, a time period for the past storms;
monitor a current set of weather conditions, and
run a machine learning prediction model to predict, based on the current weather condition, a weather-related service disturbance event potentially affecting a number of customers or resources within a time frame of interest, said prediction model trained using the re-assigned service ticket labels to correlate past identified disturbance time windows associated with past storms with infrastructure and weather related variables for use in minimizing weather-related service disturbances;
wherein responsive to said prediction, implement a preventative action to mitigate any predicted weather-related service disturbance event in the specified region.

2. The system of claim 1, wherein to determine a baseline mean periodically-aggregated rate of expected service related records under non-disturbance conditions of the time period, the processor is further configured to:
 obtain a vector of random variables comprising a number of periodically-aggregated rate values of said service related records;
 trim said vector by removing a predetermined number of highest periodically-aggregated rate values and a predetermined number of lowest periodically-aggregated rate values from the predetermined time period;
 calculate a trimmed mean periodically-aggregated rate estimate by averaging remaining data points in the vector;
 apply an additive bias adjustment factor to said trimmed mean estimate; and
 apply a lower threshold to prevent the trimmed mean estimate from being below a lower bound value.

3. The system of claim 2, wherein to determine the set of standardized periodically-aggregated scores, the processor is further configured to:
 determine a difference between the baseline mean periodically-aggregated rate of expected service related tickets and the observed actual event rate; and
 apply a standard normalization to said determined difference to obtain each standardized periodically-aggregated score.

4. The system of claim 1, wherein the processor is further configured to:
 determine a labeling coverage for each service ticket of said set of service tickets during the time period, said labeling coverage comprising a percentage of the missing labeling or a labeling having a temporal or spatial discrepancy;
 check a data quality of the service tickets happened during the time period based on said labeling coverage.

5. The system of claim 1, wherein the processor is further configured to:
 establish a data quality check using a metric defining the coverage of the labeled events falling into the set of known disturbance periods.

6. The system of claim 1, wherein to relabel, the processor is further configured to:
 assign an environmental disturbance identifier (ID) to the service record.

7. A computer-implemented method comprising:
 receiving, by a hardware processor, a set of service records from a data source, one or more service records corresponding to a plurality of weather-related service disturbance-revealing events of a specified region occurring during a time period, one or more service records being mislabeled or having no label relating to an associated weather-related service disturbance;
 determining, by said hardware processor, an observed actual event rate for weather-related service disturbance revealing events of the time period;
 determining, by said hardware processor, a baseline mean periodically-aggregated rate of expected service related records under non-disturbance conditions of the time period;
 determining, by said hardware processor, a set of standardized periodically-aggregated scores as a function of the baseline mean periodically-aggregated rate and observed actual event rate during the time period;

identifying, by said hardware processor, a weather-related service disturbance time window based on changes of standardized periodically-aggregated scores detected during the time period;
  generating, by said hardware processor, an auto-restarting cumulative sum chart having a sequence of control scheme values for disturbance identification, said sequence of control scheme values being transformed from corresponding score values in the set of standardized periodically-aggregated scores and modified according to a cumulative sum reference parameter;
  identifying, by said hardware processor, a time when a control scheme value exceeds a sensitivity threshold parameter value;
  determining an end of episode condition that establishes a bound for an end time of said disturbance condition and determining, by said hardware processor, an end time of said disturbance time window based on the identified time in said auto-restarting cumulative sum chart; and
  determining a beginning of episode condition that establishes a bound for a start time of said disturbance condition and determining a start time of said disturbance time window based on the identified time in said auto-restarting cumulative sum chart; and
  automatically re-starting a transforming of said sequence of control scheme values from corresponding values at each identified time a control scheme value exceeds a sensitivity threshold parameter value; and
generating, by said hardware processor, a disturbance-related probability for the service tickets corresponding to the identified weather-related service disturbance time window; and
re-assigning a label, based on the generated probability, to a service record as being related to the identified weather-related service disturbance time window
obtaining, based on re-assigned labels to service tickets for identified weather-related service disturbance time windows associated with past storms, a time period for the past storms;
monitoring a current set of weather conditions,
running a machine learning prediction model to predict, based on the current weather condition, a weather-related service disturbance event potentially affecting a number of customers or resources within a time frame of interest, said prediction model trained using the re-assigned service ticket labels to correlate past identified disturbance time windows associated with past storms with infrastructure and weather related variables for use in minimizing weather-related service disturbances;
wherein responsive to said prediction, implement a preventative action to mitigate any predicted weather-related service disturbance event in the specified region.

8. The computer-implemented method of claim 7, wherein the determining a baseline mean periodically-aggregated rate of expected service related records under non-disturbance conditions of the time period comprises:
  obtaining, by said hardware processor, a vector of random variables comprising a number of periodically-aggregated rate values of said service related records;
  trimming said vector, by said hardware processor, by removing a predetermined number of highest periodically-aggregated rate values and a predetermined number of lowest periodically-aggregated rate values from the predetermined time period;
  calculating, by said hardware processor, a trimmed mean periodically-aggregated rate estimate by averaging remaining data points in the vector;
  applying, by said hardware processor, an additive bias adjustment factor to said trimmed mean estimate; and
  applying, by said hardware processor, a lower threshold to prevent the trimmed mean estimate from being below a lower bound value.

9. The computer-implemented method of claim 8, wherein the determining of the set of standardized periodically-aggregated scores comprises:
  determining, by said hardware processor, a difference between the baseline mean periodically-aggregated rate of expected service related tickets and the observed actual event rate; and
  applying, by said hardware processor, a standard normalization to said determined difference to obtain each standardized periodically-aggregated score.

10. A computer program product for probabilistic labeling, the computer program product comprising a computer readable storage medium having program instructions embodied therewith, the program instructions executable by a processor of a device to cause the device to:
  receive a set of service records from a data source, one or more service records corresponding to a plurality of weather-related service disturbance-revealing events of a specified region occurring during a time period, one or more service records being mislabeled or having no label relating to an associated weather-related service disturbance;
  determine an observed actual event rate for weather-related service disturbance-revealing events of the time period;
  determine a baseline mean periodically-aggregated rate of expected service related records under non-disturbance conditions of the time period;
  determine a set of standardized periodically-aggregated scores as a function of the baseline mean periodically-aggregated rate and observed actual event rate during the time period;
  apply a calibrated change-point analysis to identify a weather-related service disturbance time window based on changes of score values in the set of standardized periodically-aggregated scores detected during the time period, said identifying comprising applying a calibrated change-point analysis to separate a non-disturbance condition of the time period from a disturbance condition of the time period, wherein the applying a calibrated change-point analysis to identify a disturbance time window comprises:
    generate an auto-restarting cumulative sum chart having a sequence of control scheme values for disturbance identification, said sequence of control scheme values being transformed from corresponding score values in the set of standardized periodically-aggregated scores and modified according to a cumulative sum reference parameter;
    identify a time when a control scheme value exceeds a sensitivity threshold parameter value;
    determine an end of episode condition that establishes a bound for an end time of said disturbance condition and determine an end time of said disturbance time window based on the identified time in said auto-restarting cumulative sum chart;

determine a beginning of episode condition that establishes a bound for a start time of said disturbance condition and determine a start time of said disturbance time window based on the identified time in said auto-restarting cumulative sum chart; and automatically re-start a transforming of said sequence of control scheme values from corresponding values at each identified time a control scheme value exceeds a sensitivity threshold parameter value; and generate a disturbance-related probability for the service records corresponding to the identified weather-related service disturbance time window;

re-assign a label, based on the generated probability, to a service ticket as being related to the identified weather-related service disturbance time window;

obtain, based on re-assigned labels to service tickets for identified weather-related service disturbance time windows associated with past storms, a time period for the past storms;

monitor a current set of weather conditions, and run a machine learning prediction model to predict, based on the current weather condition, a weather-related service disturbance event potentially affecting a number of customers or resources within a time frame of interest, said prediction model trained using the re-assigned service ticket labels to correlate past identified disturbance time windows associated with past storms with infrastructure and weather related variables for use in minimizing weather-related service disturbances;

wherein responsive to said prediction, implement a preventative action to mitigate any predicted weather-related service disturbance event in the specified region.

11. The computer program product of claim 10, wherein to determine a baseline mean periodically-aggregated rate of expected service related records under non-disturbance conditions of the time period, the program instructions are executable by the processor of the device to cause the device to:

obtain a vector of random variables comprising a number of periodically-aggregated rate values of said service related records;

trim said vector by removing a predetermined number of highest periodically-aggregated rate values and a predetermined number of lowest periodically-aggregated rate values from the predetermined time period;

calculate a trimmed mean periodically-aggregated rate estimate by averaging remaining data points in the vector;

apply an additive bias adjustment factor to said trimmed mean estimate; and apply a lower threshold to prevent the trimmed mean estimate from being below a lower bound value.

12. The computer program product of claim 11, wherein to determine the set of standardized periodically-aggregated scores, the program instructions are executable by the processor of the device to cause the device to:

determine a difference between the baseline mean periodically-aggregated rate of expected service related tickets and the observed actual event rate; and apply a standard normalization to said determined difference to obtain each standardized periodically-aggregated score.

* * * * *